United States Patent Office 3,356,954
Patented Dec. 5, 1967

3,356,954
WHEEL SUSPENSION SYSTEM FOR ROAD VEHICLES AND CROSS-COUNTRY VEHICLES
Heinrich Georg Gottschalk, Bullach, near Nurnberg, Germany, assignor to Karl Heinz Schmidt, Vorra, Kreis, Hersbruck, Germany
Filed Dec. 9, 1964, Ser. No. 417,150
11 Claims. (Cl. 280—6)

This invention relates to hydraulic and hydraulically pneumatic wheel suspensions for highway or road vehicles and off-the-road vehicles or cross-country cars.

It is an object of this invention to provide a wheel suspension for highway and cross-country vehicles, which is effective to uniformly distribute the pressure exerted on the wheels due to the weight of the vehicle acting on the wheels.

It is another object of the invention to provide a wheel suspension for highway and cross-country vehicles, which enables the wheel pressure within determined groups of wheels to be uniformly distributed onto the wheels.

It is still another object of this invention to provide a wheel suspension for highway and cross-country vehicles so as to compensate the wheel pressure under the wheels at each respective side of the vehicle, that is to say, for example to compensate the wheel pressure of the front wheels and that of the rear wheels of each respective side of the vehicle.

It is still another object of this invention to provide a wheel suspension for highway and cross-country vehicles so that the wheel pressure of the front wheels of one side of the vehicle will be equalized in a crosswise manner with respect to the wheel pressure of the rear wheels at the other side of the vehicle.

It is still another object of this invention to provide a wheel suspension for highway and cross-country vehicles wherein the movement of the individual vehicle members resulting from said wheel pressure compensation is damped.

It is still another object of this invention to provide a wheel suspension for highway and cross-country vehicles including the above-mentioned wheel pressure compensation, wherein the wheel pressure compensating connection of the suspension elements of individual wheels with the suspension elements of other wheels can be interrupted.

It is still another object of this invention to provide a wheel suspension for highway and cross-country vehicles with wheel pressure compensation, wherein the individual wheels can be fixed with respect to the chassis.

It is still another object of this invention to provide a wheel suspension for highway and cross-country vehicles, wherein individual wheels can be lifted toward the chassis or lifted from the roadway by their corresponding suspension elements, while other wheels remain on the roadway and hold the chassis at a predetermined height above the roadway.

It is still another object of this invention to provide a wheel suspension for highway and cross-country vehicles, wherein the vehicle can be tilted in any desired inclination to the roadway by raising or lowering the wheels of corresponding groups of wheel suspension elements.

It is still another object of this invention to provide a wheel suspension for highway and cross-country vehicles including a hydraulically pneumatic suspension, wherein at least one compressible gas cushion in an extensible chamber constitutes the suspension for at least one respective wheel of the vehicle.

It is still another object of this invention to provide a wheel suspension for highway and cross-country vehicles including a hydraulically pneumatic suspension, wherein the cushioning movement of the vehicle members is damped.

It is still another object of this invention to provide a wheel suspension for highway and cross-country vehicles by means of hydraulically pneumatic cushioning, wherein the cushioning effect of individual suspension elements can be eliminated.

It is still another object of this invention to provide a wheel suspension for highway and cross-country vehicles, wherein one or more of the above-mentioned effects of the suspension elements can be adjusted from the driver's cab.

Finally, it is still another object of this invention to provide a wheel suspension for trucks including a crane superstructure, which will have good roadability during the drive and the travelling gear of which can be adapted to the respective load conditions prevailing during the crane operation.

In accordance with an aspect of this invention, a vehicle having hydraulic suspension wheel pressure compensation means and means for damping the movement of the respective vehicle members produced by the wheel pressure compensation comprises a plurality of wheel suspension elements of the above-described type, each of which connects at least one wheel to the cassis. The cylinder space of greater volume of each suspension element can be connected to the respective opposite cylinder space of lesser or smaller volume of the same cylinder by way of a branch conduit bypassing the associated piston. In addition, at least a number of the greater cylinder spaces of at least a number of suspension elements are connected to each other in groups by way of first conduit means including throttle means and check or shutoff valves provided therein. Due to said check valves in the first conduit means, the wheel pressure compenstating connection to individual suspension elements can be interrupted.

The first conduit means of the interconnected larger cylinder spaces of the suspension elements are conjointly in communication with a respective source of fluid under pressure, which can be shut off, as well as with a container for fluid under pressure, which can also be shut off and which serves as a pressure sink. Due to this arrangement, it is possible to raise or lower the vehicle as a whole or, at will, within the range of predetermined wheels or suspension elements relative to the roadway.

In accordance with another aspect of this invention, the conduit means connecting the greater or larger cylinder space of a suspension element with the smaller cylinder space of the same suspension element have shutoff valves therein, and at the same time the smaller cylinder spaces of at least a few of the suspension elements are in a group-like manner in communication with each other via second conduit means. Said second conduit means also have throttle means and shutoff valves therein and are, in the same manner as the first conduit means, in communication with a respective source of fluid under pressure which is adapted to be shut off, as well as with a container for fluid under pressure which can also be shut off and which serves as a pressure sink. In a vehicle having such a wheel suspension, it is possible to raise any wheels desired toward the chassis or to lift them from the roadway, while other wheels remain in their position and support the chassis on the roadway. Besides, a vehicle equipped in this manner can be lifted or lowered at will unilaterally or as a whole relative to the roadway.

In accordance with another aspect of this invention, the larger cylinder space of each suspension element is in communication with at least one hydraulically pneumatic resilient element. In order to improve the damping of the cushioning movements, it is advisable to also provide a branch line or conduit with throttle restrictions and, optionally, with throttle and check valves. If possible, it is preferred to provide a single hydraulically pneumatic cushion element only for the total suspension of a vehicle, wherein at least a number of suspension elements are connected to said cushion element by way of the third branch lines in the manner described hereinabove.

Vehicles provided with such a wheel suspension, as compared with the preceding vehicles described hereinbefore, have the additional advantage that the wheels can be cushioned at least during the drive.

According to the invention, the afore-mentioned valves are hydraulically, pneumatically, electrically or mechanically remotely controllable. For the hydraulic or pneumatic remote control, there are provided corresponding pressure cylinders including pistons and readjustment springs. For an electric remote control, there are employed lifting magnets and return or readjustment springs. For example, a mechanical remote control requires suitable leverages, Bowden cables or wire layers and readjusting springs.

The above, and other objects, features and advantages of this invention, will be apparent in the following detailed description of several illustrative embodiments thereof which is to be read in connection with the accompanying drawings forming a part thereof, and wherein:

FIG. 1 is a schematic view of a hydraulic wheel suspension according to the invention, for highway and cross-country vehicles, with wheel pressure compensation between different suspension elements being assembled in groups, throttle means or restrictions and check or stop valves in the conduit means connecting respective larger cylinder spaces with each other, and a source for fluid under pressure which is capable of being shut off, as well as a container for fluid under pressure, which can be shut off, said conduit means being adapted to be correspondingly connected therewith in groups;

FIG. 2 is a schematic view of a modified embodiment of the wheel suspension shown in FIGURE 1;

FIG. 3 is a schematic view of another wheel suspension for highway and cross-country vehicles, which is a further development of the wheel suspension of FIGURE 1, wherein shutoff valves are additionally provided in the conduits connecting the larger cylinder space of each respective suspension element with the smaller cylinder space of the same suspension element, and wherein, in addition, the smaller cylinder spaces are interconnected by way of second conduit means provided with throttle means and check valves and are adapted to be connected with the pressure fluid source and with the pressure fluid container, both of which can be shut off;

FIG. 4 is a schematic view of a modified embodiment of the wheel suspension shown in FIGURE 3;

FIG. 5 is a schematic view of an embodiment of a wheel suspension for highway and cross-country vehicles which, as compared with the wheel suspension shown in FIGURE 3, represents a further development, and in which the respective larger cylinder spaces of at least a number of suspension elements are additionally connected with hydraulically pneumatic cushioning elements via branch lines provided with throttle means and stop valves;

Figure 1:
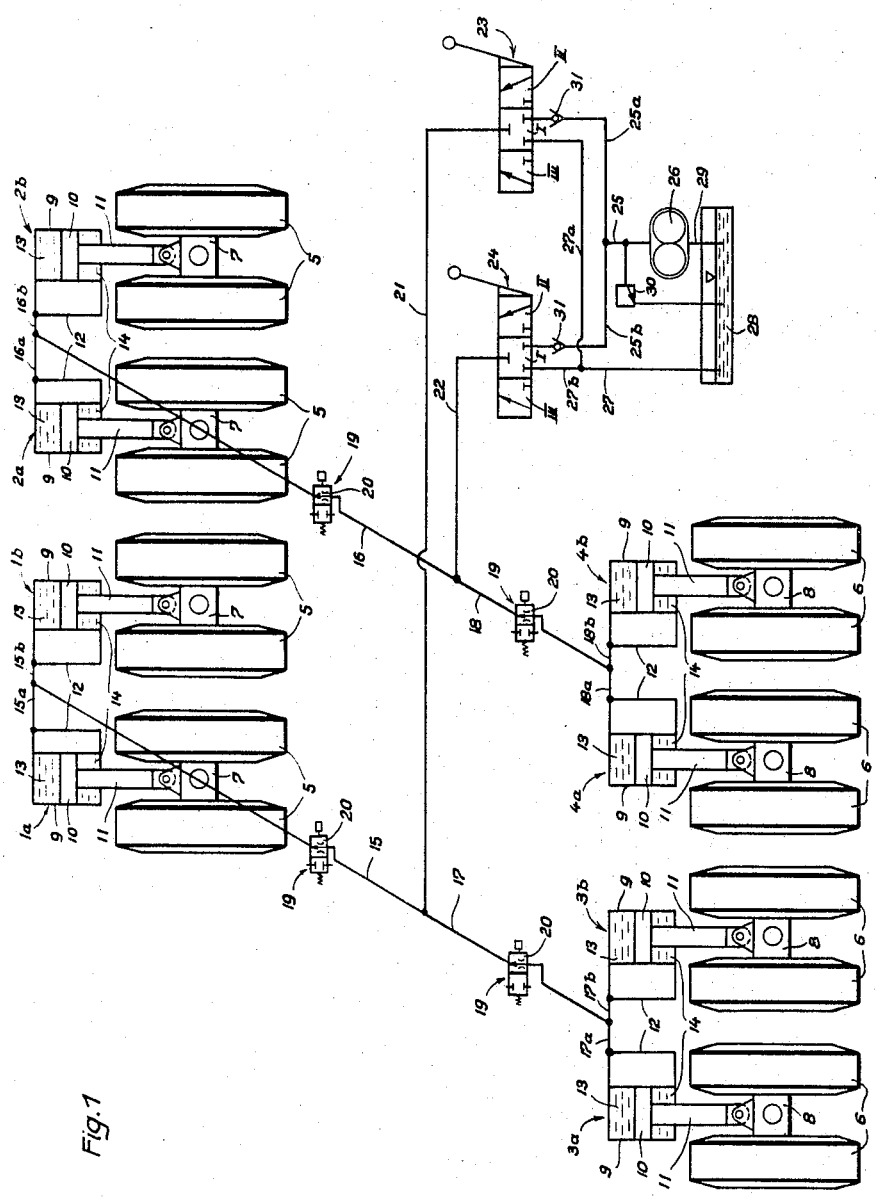

Referring now to the drawings in detail, and initially to FIGURE 1 thereof, it will be seen that this figure shows one of the simplest embodiments of a wheel suspension for highway and cross-country vehicles in accordance with this invention. A pair of suspension elements $1a$, $1b$, $2a$, $2b$, $3a$, $3b$, $4a$ and $4b$ provide the connection between a chassis (not shown) and respective pairs of wheels 5 and 6 connected to each other by axles 7 and 8, respectively. The suspension elements each substantially comprise a cylinder 9 closed at both ends, a piston 10 movable in said cylinder, and a piston rod 11 having a substantial diameter with respect to the diameter of the piston projecting from said cylinder. The piston rod 11 of each suspension element is hingedly connected to the corresponding wheel axles 7 and 8, respectively, at said pair of wheels 5, 6.

To each cylinder 9 there is connected a respective by-pass conduit 12 connecting one greater or larger cylinder space 13 opposite the piston rod 11 with a smaller cylinder space 14 of the same cylinder disposed at the side of the piston rod. Branch lines $15a$ and $15b$ are correspondingly connected with the larger cylinder space 13 of the suspension elements $1a$ and $1b$ and are united into a first branch line 15. Besides, first branch lines 16, 17 and 18 are connected with the larger cylinder spaces 13 of the suspension elements $2a$ and $2b$ via corresponding branch lines $16a$ and $16b$, with the larger cylinder spaces 13 of the suspension elements $3a$ and $3b$ via further corresponding branch lines $17a$ and $17b$, and with the larger cylinder spaces of the suspension elements $4a$ and $4b$ via still further corresponding branch lines $18a$ and $18b$.

Each of the first branch lines 15, 16, 17 and 18 has a shutoff valve 19 with a throttle constriction 20. The throttle constriction 20 is effective in the shutoff valve 19 until the shutoff valve remains open. The first branch lines 15 and 17, on the one hand, and the first branch lines 16 and 18, on the other hand, are connected with each other and, in addition, with a corresponding first supply line 21 and 22. The first supply lines lead to a source 25 for fluid under pressure and to a container 28 for fluid under pressure, which are adapted to be shut off and which are described in detail hereinafter. Thus, the larger cylinder spaces 13 of the suspension elements $1a$, $1b$, $3a$ and $3b$, on the one hand, and the larger cylinder spaces 13 of the suspension elements $2a$, $2b$, $4a$ and $4b$, on the other, are interconnected in groups and are also connected with said source and said container for pressure fluid, which can be shut off.

Said first supply lines 21 and 22 lead to respective first outlets of corresponding three-way valves 23 and 24. The second outlets of the three-way valves 23 and 24 are in communication with the pressure side of a pressure fluid pump 26 via corresponding branch lines $25a$ and $25b$ of forked pressure line 25. Third outlets of said three-way valves 23 and 24 are in communication with a pressure fluid container 28, which is open to the atmosphere, by of branch lines $27a$ and $27b$ of a forked discharge conduit 27. In addition, a suction pipe 29 leads from the suction side of the pressure fluid pump 26 to the pressure fluid container 28. An overflow conduit including a pressure relief valve 30 leading from the pressure side of the pressure fluid pump 26 to the suction side prevents the unlimited increase of the pressure at the pressure side of the pressure fluid pump 26.

In the branch lines 25a and 25b of the pressure line 25 is provided a check valve 31 to prevent the pressure fluid from flowing out from the conduits and cylinder spaces of the vehicle suspension into the pressure fluid container 28 when the pressure fluid pump 26 is rendered inoperative during stoppage or failure. Instead of the two check valves 31 in the branch lines 25a and 25b, it is also possible to provide a single check valve in the common pressure line 25.

The two three-way valves 23 and 24 can assume three respective control positions. In a first control position I, all connections are separated from each other. In a second control position II, the supply conduits 21 and 22 are in communication with the branch lines 25a and 25b of the pressure line 25, so that the pressure fluid pump 26 can feed pressure fluid to the branch lines 15, 17 and 16, 18. In a third position III of the three-way valves 23 and 24, the corresponding supply lines 21 and 22 are in communication with the branch lines 27a and 27b of the discharge conduit 27, so that the pressure fluid can flow out from the corresponding branch lines 15 and 17 and 16 and 18 into the pressure fluid container 28.

In order to understand the function of the wheel suspension better in accordance with this invention, it is to be also especially noted that the cross section of each piston rod 11 should be large in proportion to the cross section of the associated piston 10 so that when the piston 10 and the piston rod 11 are displaced in the cylinder 9 of each individual suspension element, the change in volume of the larger cylinder space 13 opposite the piston rod 11 should be considerably greater than the respective change in volume of the smaller cylinder space 14 of the same cylinder. All cylinders, conduits and further means connected therewith in accordance with the wheel suspension of this invention are filled with at least one fluid under pressure. This fluid is preferably an incompressible liquid such as, for example, a hydraulic oil. Yet also compressible gases, for example air, can be employed as fluids under pressure within the scope of the present invention.

Accordingly, when a piston rod 11 and a piston 10 are displaced in a cylinder 9, one part of said pressure fluid will flow by way of the corresponding bypass line 12 from one cylinder space to the respective other cylinder space of the same cylinder. Yet a further part of the pressure fluid flows simultaneously in the branch line connected with the cylinder, namely, either to this cylinder or away from this cylinder. Consequently, the displacement of the piston and piston rod within the cylinder concerned causes a change in volume within this cylinder, and since this change in volume is connected with the suction or with the displacement of one part of the pressure fluid, the displacement of the piston rod and piston in this cylinder causes a change in volume of the pressure fluid in some other part of the wheel suspension. Vice versa, a forced change in volume of the pressure fluid in one cylinder 9 causes a corresponding displacement of the piston 10 located therein and in the piston rod 11 associated therewith.

Since, for example, the cylinders 9 of the suspension elements 1a and 1b are connected with each other by way of the branch lines 15a and 15b, then in the cylinder spaces of these two suspension elements there prevails the same pressure in each respective space so that the two suspension elements transmit the same forces from the chassis to the wheel axles. Overload of one of both suspension elements, such as for example, an overload of the suspension element 1a is effective so that the associated piston rod 11 and the associated piston 10 are pushed further into the cylinder 9, and that one part of the pressure fluid is displaced from the cylinder 9 of the suspension element 1a via the branch lines 15a and 15b into the cylinder 9 of the suspension element 1b supposed to be less loaded. At the same time, the piston 10 and the associated piston rod 11 is displaced in the cylinder 9 of the suspension element 1b until the load conditions of the two suspension elements 1a and 1b are again compensated. This is the wheel pressure compensation between the suspension elements 1a and 1b.

Since the cylinders 9 of the suspension elements 1a and 1b can be connected with the cylinders 9 of the suspension elements 3a and 3b via the branch lines 15 and 17, a wheel pressure compensation such as previously described between these suspension elements and between the appertaining wheels is also possible. When the shutoff valves 19 in the branch lines 15 and 17 are closed, the wheel pressure compensation between the suspension elements 1a and 1b, on the one hand, and between the suspension elements 3a and 3b, on the other, does not take place. The same conditions as between the suspension elements 1a, 1b, 3a and 3b exist also between the suspension elements 2a, 2b, 4a and 4b.

When fluid under pressure flows into any cylinder 9 by way of the branch line connected therewith, the piston located therein and the associated piston rod 11 move downwardly while the chassis of the vehicle secured to the suspension element is accordingly lifted relative to the roadway. Vice versa, when pressure fluid flows out from a cylinder 9 of any of the suspension elements via the branch line connected therewith, the chassis with its weight forces the cylinder downwardly relative to the piston rod 11 and the piston 10 secured thereto, so that the chassis at the respective point can be lowered in the direction toward the roadway.

Thus, when all shutoff valves 19 in the branch lines 15, 16, 17 and 18 are open, in the control position II of the three-way valves 23 and 24 the chassis will be raised at all suspension elements 1a, 1b, 2a, 2b, 3a, 3b and 4a, 4b, because in this control position the pressure fluid pump 26 pumps fluid under pressure into the large cylinder spaces 13 of these suspension elements, while in the third control position III of the three-way valves 23 and 24 the chassis will be lowered at all suspension elements, because in this case fluid under pressure flows back from the large cylinder space 13 of the suspension elements into the container 28 for fluid under pressure.

Yet, for example, when the first control position I is maintained at the three-way valve 23 while the three-way valve 24 is in its second control position II or in its third control position III, the left-hand portion of the chassis according to FIGURE 1 remains in its position relative to the roadway, while the right-hand side of the vehicle within the range of the suspension elements 2a, 2b, 4a and 4b is raised or lowered, respectively.

On the other hand, when, for example, the shutoff valves 19 in the branch lines 15 and 16 are closed while the shutoff valves 19 in the branch lines 17 and 18 are open, the rear side of the vehicle according to FIGURE 1 can be held in its position, while the front side of the vehicle will be raised or lowered, respectively, according to the position of the three-way valves 23 and 24.

From these examples, it will be apparent that in the wheel suspension shown in FIGURE 1, it is possible to position and maintain any desired clearance above the road surface, as well as any position of the chassis with respect to the roadway.

Figure 2:
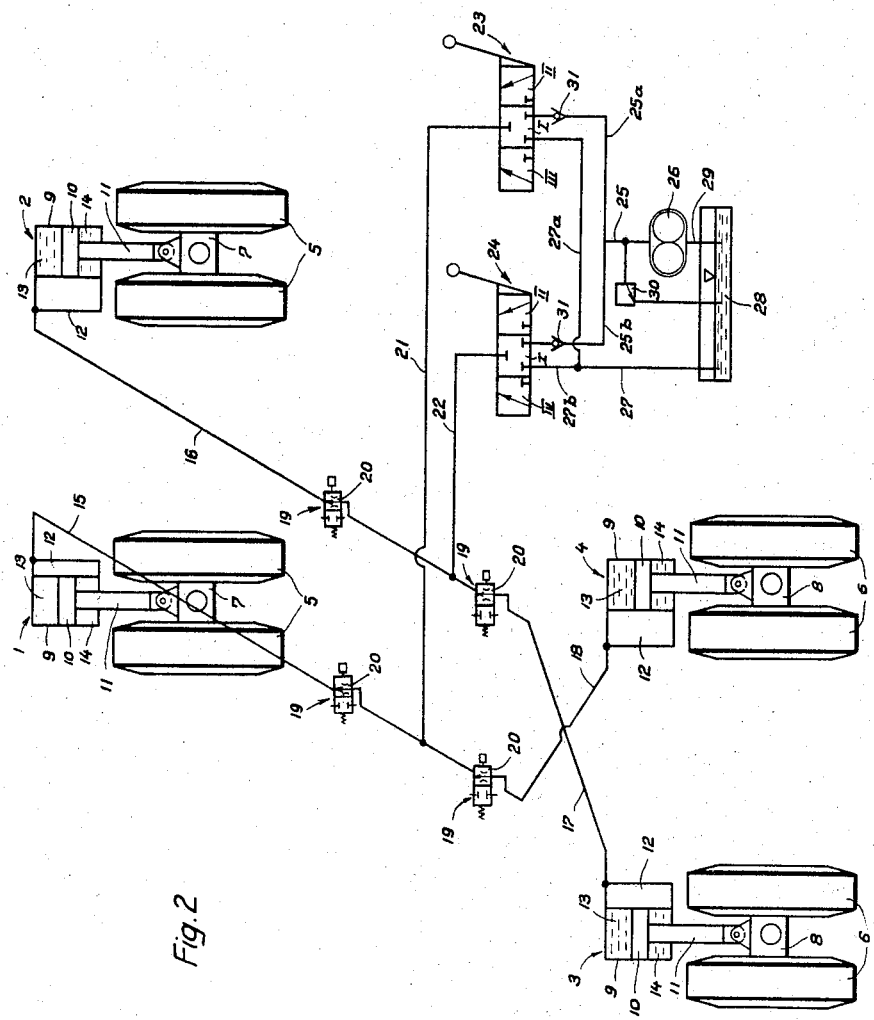

The wheel suspension according to the invention as shown in FIGURE 2 of the drawings differs from the wheel suspension shown in FIGURE 1 of the drawings solely by the number of wheels, the number of suspension elements and the grouping of the large cylinder spaces of the suspension elements connected with each other by way of the branch lines. In this embodiment, only two pairs of rear wheels 5 and two pairs of front wheels 6 are suspended on the chassis. Rear wheels 5 of a pair are connected to each other by a rear wheel axle 7 and hinged to one of the corresponding piston rods 11 of the rear suspension elements 1 and 2. Likewise, front wheels 6 of a pair are connected to each other by a front wheel axle 8 and hinged to one of the corresponding piston rods 11 of the front suspension elements 3 and 4.

According to FIGURE 2, the branch line 17 connects the larger cylinder space 13 of the left-hand front suspension element 3 with the supply line 22 and the branch line 16 which is connected with the larger cylinder space 13 of the right-hand rear suspension element 2. In like manner, the branch line 18 connects the large cylinder space 13 of the front right-hand suspension element 4 with the supply line 21 and the branch line 15 which is connected with the left-hand rear suspension element 1.

The function of the wheel suspension according to FIGURE 2 differs from the function of the wheel suspension shown in FIGURE 1 merely in that when the shutoff valves 19 are open, then a wheel pressure compensation in the four pairs of wheels takes place crosswise, that is to say, for example the right-hand rear wheels 5 with the suspension element 2 have the same wheel pressure as the left-hand front wheels 6 with their suspension element 3, and respectively, the left-hand rear wheels 5 with their suspension element 1 have the same wheel pressure as the right-hand front wheels 6 with their suspension element 4. This mode of wheel pressure compensation has the advantage that the superstructures of the vehicle do not reel over the chassis when the wheel pressure on one of the wheels varies momentarily.

Figure 3:
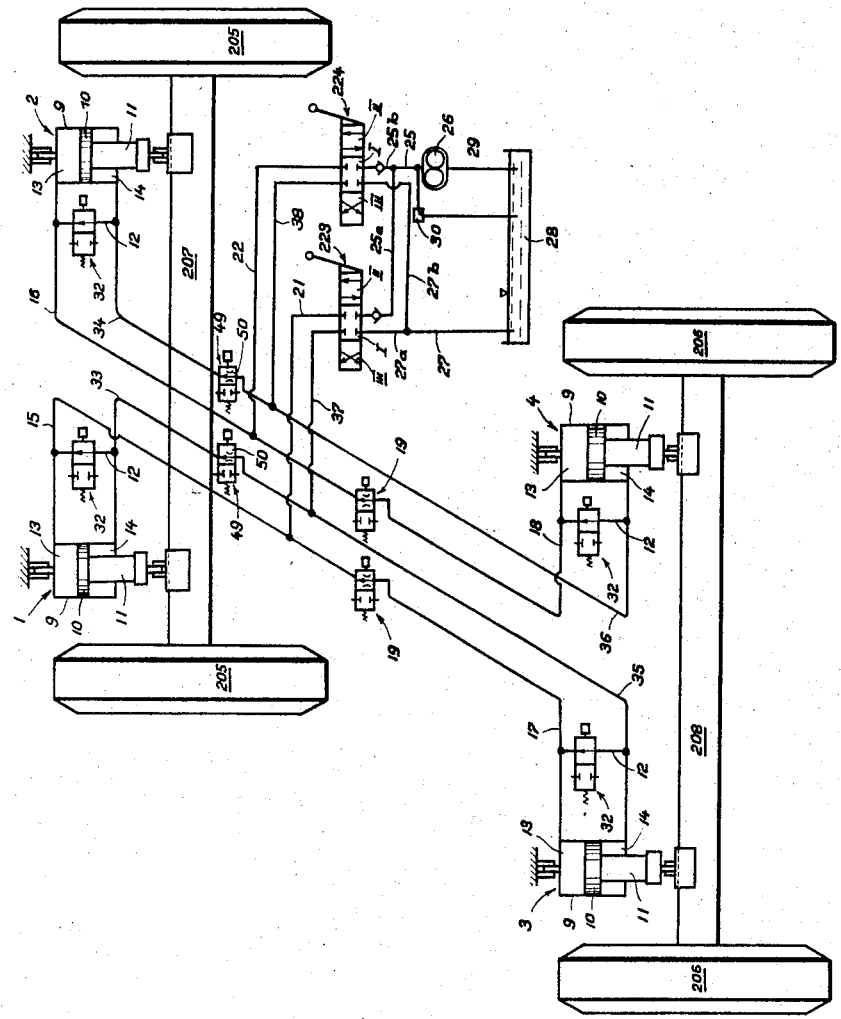

FIGURE 3 of the drawings show an embodiment of the invention wherein the suspension elements 1, 2, 3 and 4 are completely identical with the suspension elements shown in FIGURES 1 and 2 of the drawings. On the piston rods 11 of the two rear suspension elements 1 and 2 there is now linked a continuous rear axle 207, at the ends of which there are disposed two rear wheels 205. Likewise, on the corresponding piston rods 11 of the two front suspension elements 3 and 4 there is linked a continuous front axle 208, at the ends of which there are arranged two front wheels 206.

The greater or larger cylinder spaces 13 of the suspension elements 1, 2, 3, 4 opposite the piston rod 11 are also in the embodiment shown in FIGURE 3, in communication with the lesser or smaller cylinder spaces 14 of the respective cylinder 9 via bypass conduits 12. Yet according to the embodiment of the invention according to FIGURE 3, said bypass conduits include shutoff valves 32, by means of which the respective connections between the larger cylinder spaces 13 and the smaller cylinder spaces 14 of the respective cylinder 9 can be interrupted.

As already described in conjunction with the embodiments of the invention according to FIGURES 1 and 2 of the drawings, the branch line 15 is connected with the larger cylinder space 13 of the suspension element 1, the branch line 16 is connected with the larger cylinder space 13 of the suspension element 2, the branch line 17 is connected wtih the larger cylinder space 13 of the suspension element 3, and the branch line 18 is connected with the larger cylinder space 13 of the suspension element 4. The branch lines 15 and 17 are connected with each other and with the already described supply line 21. Accordingly, the branch lines 16 and 18 are also in communication with each other and with the supply line 22.

In addition, in the embodiment according to FIGURE 3, are provided second branch lines 33, 34, 35 and 36 which are connected with the smaller cylinder spaces 14 of the cylinder 9 of the suspension elements 1, 2, 3, and 4. Thus, the second branch line 33 leads to the smaller cylinder space 14 of the suspension element 1, the second branch line 34 leads to the smaller cylinder space of the suspension element 2, the second branch line 35 leads to the smaller cylinder space of the suspension element 3, and the second branch line 36 leads to the smaller cylinder space of the suspension element 4. The branch lines 33 and 35 as well as a supply line 37 are connected with each other. Also, the branch lines 34 and 36 as well as a supply line 38 are interconnected. The lines 15, 17 and 16, 18 respectively constitute the conduit leading from the greater space of a cylinder for a rear wheel to the greater space of a cylinder for a front wheel. The lines 33, 35 and 34, 36 respectively constitute the conduit leading from the lesser space of a cylinder for a rear wheel to the lesser space of a cylinder for a front wheel.

While there are no shutoff valves in the first branch lines 15 and 16, and the second branch lines 33 and 34 there are provided shutoff valves 49 which, in their open position, show a throttle constriction 50. Also in the first branch lines 17 and 18 are arranged the shutoff valves 19. The mode of operation would be the same if the shutoff valves 49 were not arranged in the second branch lines 33 and 34 but in the second branch lines 35 and 36 and if instead of the shutoff valves 19 provided in the first branch lines 17 and 18 there were provided corresponding shutoff valves in the first branch lines 15 and 16.

Consequently, in the embodiment of the invention according to FIGURE 3 there each time equal cylinder spaces of the suspension elements 1 and 3, on the one hand, and the suspension elements 2 and 4, on the other, are in communication with each other.

The connections between the smaller cylinder spaces 14 of the suspension elements concerned can be interrupted by closing the shutoff valve 49, while an interruption of the connection between the larger cylinder spaces 13 of the suspension elements concerned, is possible by actuation of the shutoff valves 19. Thus, the wheel pressure compensation taking place at the suspension elements concerned when the shutoff valves 19 and 49 are open can be stopped if not required for some reason or if undesirable.

The supply lines 21 and 37, on the one hand, and the supply lines 22 and 38, on the other, lead to two valve units 223 and 224 which function as two three-way valves acting in a counter-current direction and accordingly include two respective first connections for the supply lines 21 and 37 and for the supply lines 22 and 38, respectively, as well as a second and a third connection. The second and the third connection of each of said valve units 223 and 224 are connected with said fluid pressure pump 26 and fluid pressure container 28 as already described in conjunction with the second and third connections of the three-way valves 23, 24 shown in FIGURES 1 and 2 of the drawings. Thus, the branch line 25a of the pressure line 25 now leads to the second connection of the valve unit 223, and the third connection thereof is connected with the branch line 27a of the discharge line 27. The branch line 25b of the pressure line 25 is in communication with the second connection of the valve unit 224, and to the third connection of which the branch line 27b of the discharge line 27 is connected.

The valve units 223 and 224 each have the same function which will now be elucidated in greater detail by way of example with the valve unit 223. In the valve unit 223 in its first position I all lines 21, 25a, 27a and 37 are separated from each other and closed toward the exterior. Thus, in this position the above-described conditions are maintained in the whole wheel suspension. In a second position II the supply line 21 is in communication with the branch line 25a of the pressure line 25 on the one hand, while the supply line 37 is in communication with the branch line 27a of the discharge line 27 on the other. In this position, the pressure fluid pump 26 feeds pressure fluid to the branch lines 15 and 17, while pressure fluid flows from the branch lines 33 and 35 into the pressure fluid container 28. In a third position III, the supply line 21 is in communication with the branch line 27a of the discharge line 27 on the one hand, while the supply line 37 is in communication with the branch line 25a of the pressure line 25 on the other. In this position, the pressure fluid pump 26 feeds pressure fluid into the branch lines 33 and 35, while pressure fluid flows from the branch lines 15 and 17 into the pressure fluid container 28.

In particular, hydraulic oil as a fluid under pressure is used.

The following functions can be carried out by means of the wheel suspension of FIGURE 3:

(1) Raising the whole chassis of the vehicle by closing all shutoff valves 32 and opening all shutoff valves 19 and 49, as well as by the second control position II of the valve units 223 and 224. In this manner, pressure fluid is pumped by the pressure fluid pump into the larger cylinder spaces 13 of all suspension elements 1, 2, 3 and 4, while pressure fluid simultaneously flows from the smaller cylinder spaces 14 of said suspension elements into the pressure fluid container 28 so that the larger cylinder spaces 13 can be expanded and the smaller cylinder spaces 14 contracted.

(2) Lowering the whole chassis by closing all shutoff valves 32 and opening all shutoff valves 19 and 49, as well as by the third control position III of the valve units 223 and 224. In this manner, pressure fluid is pumped by the pressure fluid pump 26 into the smaller cylinder spaces 14 of all suspension elements 1, 2, 3 and 4, while pressure fluid flows from the larger cylinder spaces 13 of said suspension elements into the pressure fluid container 28, so that the smaller cylinder spaces 14 can be expanded, while the larger cylinder spaces 13 can be contracted.

(3) Raising or lowering, respectively, of only one side of the vehicle, such as the left-hand side of the vehicle by closing the shutoff valves 32 at the suspension elements 1 and 3, opening the shutoff valve 19 of the branch line 17, the shutoff valve 49 of the branch line 33 by the first control position I of the valve unit 223 and the second control position II of the valve unit 224 for lifting, and the third control position III of the valve unit 224 for lowering the vehicle side. In these control positions, the condition of the suspension elements 2 and 4 at the right-hand side of the vehicle is maintained.

(4) Lifting or lowering, respectively, of the chassis at one end of the vehicle such as the front end of the vehicle, by closing all shutoff valves 32, closing the shutoff valves 49 in the branch lines 33 and 34, opening the shutoff valves 19 in the branch lines 17 and 18, and adjusting the second control position II of both valve units 223 and 224 for lifting, and of the third control position III of both valve units 223 and 224 for lowering the front end. In this case, the suspension elements 1 and 2 at the rear end of the vehicle remain rigid because the smaller cylinder spaces 14 of these suspension elements are completely closed and consequently a change in volume of these cylinder spaces upon displacement of the piston 10 is impossible.

In this case, it is of no consequence that the pressure produced by the pressure fluid pump 26 in the second control position II of the valve units 223 and 224 acts directly upon the surface of the pistons 10 of the suspension elements 1 and 2 because said pistons 10 cannot be displaced downwardly within the cylinder. Consequently, taking this fact into consideration, it will be apparent that it is unecessary to provide shutoff valves 19 in the branch lines 15 and 16 of the embodiment shown in FIGURE 3 to carry out the program feasible with the wheel suspension according to FIGURES 1 to 3.

(5) Raising or lowering one individual wheel while the remaining wheels maintain their position with respect to the chasses, for example raising or lowering, respectively, of the left-hand front wheel 206 (FIGURE 3) which is substantially held by the suspension element 3, closing all shutoff valves 32, by closing the shutoff valves 49 in the branch lines 33 and 34, closing the shutoff valve 19 in the branch line 18, opening the shutoff valve 19 in the branch line 17, and the second control position II of the valve unit 223 for lifting, and the third control position III of the valve unit 223 for lowering the front wheel. For carrying out this function, it is surely advantageous, yet not indispensable, that the valve unit 224 be in the first control position I.

In the second control position II of the valve unit 223, the pressure fluid pump 26 pumps pressure fluid into the larger cylinder space 13 of the suspension element 3, while pressure fluid flows out from the smaller cylinder space 14 thereof and into the pressure fluid container 28. In this manner, the piston 10 of this suspension element 3 is pushed downwardly.

In the third control position III of the valve unit 223, the pressure fluid pump 26 will force pressure fluid into the smaller cylinder space 14 of the suspension element 3 from the larger cylinder space 13 of which the pressure fluid can flow out and into the fluid container 28. The pressure in the smaller cylinder space 14 causes the piston 10 of the suspension element 3 to move upwards so that the left-hand front wheel 206 and the front wheel axle 208 will be lifted by the piston rod 11. Thus, for example, if the load of the vehicle is not distributed particularly unfavorable, the left-hand front wheel can be exchanged without using a special lifting jack.

(6) Wheel pressure compensation between a front wheel and a rear wheel of the same side of the vehicle during the drive operation, by opening all shutoff valves 19, 32 and 49 and by the first control position I of each of the two valve units 223 and 224. For the wheel pressure compensation, it is unnecessary that the shutoff valves 19 as well as the shutoff valves 49 should be open, but rather it is sufficient that either the shutoff valves 19 or the shutoff valves 49 are open.

In the cylinders 9 of the interconnected suspension elements 1 and 2 and in the cylinders 9 of the interconnected suspension elements 2 and 4 there prevail equal pressures. In this manner, all wheels of a side of the vehicle can be loaded uniformly to a far-reaching extent. During eventual impacts of the roadway to a wheel, the pressure conditions in the suspension element concerned will change, so that pressure fluid will be immediately exchanged with that of the other suspension element connected therewith. Thus, for example, if according to FIGURE 3 the left-hand rear wheel 205 receives a shock from the roadway, then this shock is transmitted via the rear axle 207 and the corresponding piston rod 11 to the piston 10 of the suspension element 1. Consequently, said piston 10 will be displaced upwardly within the cylinder 9 of the suspension element 1 to thereby increase the pressure in its larger cylinder space 13. One part of the pressure fluid in the larger cylinder space 13 flows through the bypass line 12 into the smaller cylinder space 14 which, however, will not be enlarged to the same extent as the larger cylinder space 13 diminishes so that one part of the pressure fluid will be displaced from the cylinder 9 of the suspension element 1 and flow through the branch line 15 or the branch line 33 into the cylinder 9 of the suspension element 3. Since the throttle constrictions 20 and 50 in the shutoff valves 19 and 49 counter the flowing pressure fluid with a mechanical resistance, the compensation movement of the pressure fluid and of the suspension elements coming into the question will be damped so that undesirable vibrations of the vehicle will be avoided.

Figure 4:
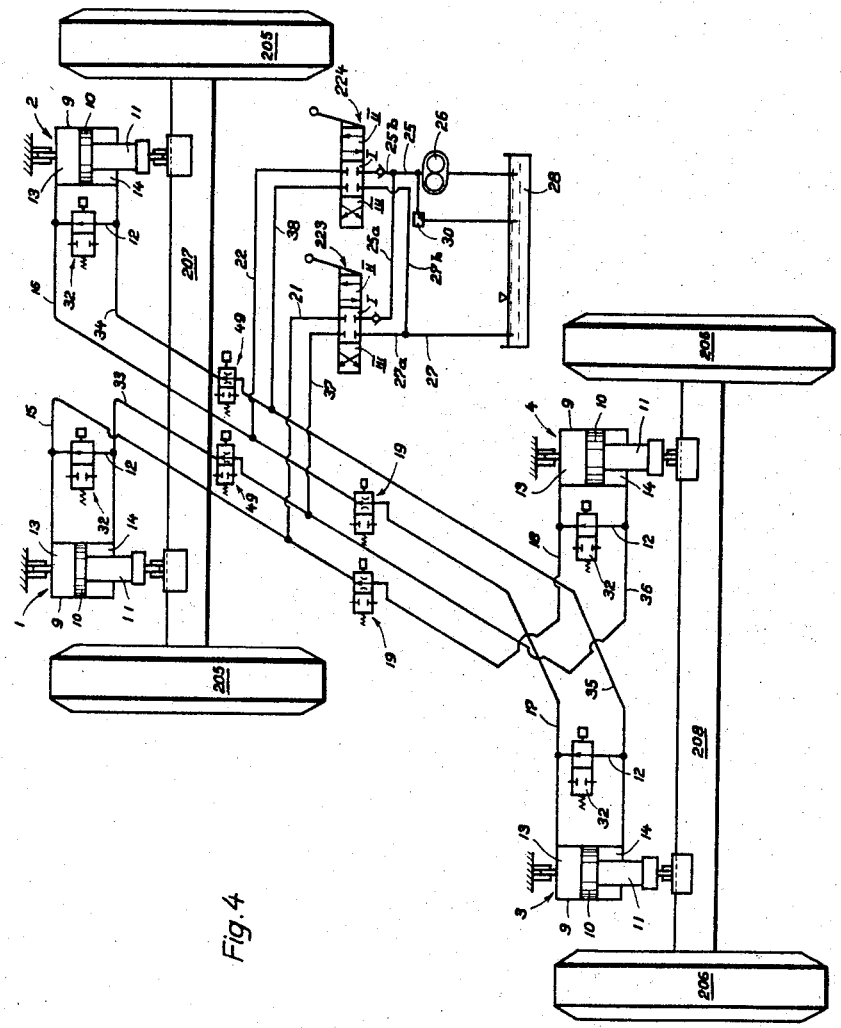

In FIGURE 4 there is shown a wheel suspension wherein solely the branch lines 17, 18, 35 and 36 are connected with the branch lines 15, 16, 33 and 34 in a manner different from that of the wheel suspension shown in FIGURE 3. In that embodiment, the branch lines 15 and 18 are connected with the supply line 21, the branch lines 33 and 36 are connected with the supply line 37, the branch lines 16 and 17 are connected with the supply line 22, and the branch lines 34 and 35 are connected with the supply line 38. Thus, the wheel pressure compensation described in conjunction with the wheel suspension according to FIGURE 3 takes place also in the wheel suspension according to FIGURE 4 between the suspension elements 1 and 4, on the one hand, and between the suspension elements 2 and 3, on the other. Consequently, all further above described functions are also possible with the wheel suspension of FIGURE 4.

Thus, for example, if the left-hand side of the vehicle in FIGURE 4 must be lifted or lowered, respectively, the first thing that must be done is to close all shutoff valves 32, the shutoff valve 49 of the branch line 34, and the shutoff valve 19 of the branch line 18. In addition, the shutoff valve 49 of the branch line 33, as well as the shutoff valve 19 of the branch line 17, must be opened, and the two valve units 223 and 224 must be brought into their second position II and into their third position III, respectively. Thus, the pistons 10 of the suspension elements 1 and 3 of the respective cylinders will now be displaced downwardly or upwardly, respectively, according to the pressures acting thereon.

Figure 5:
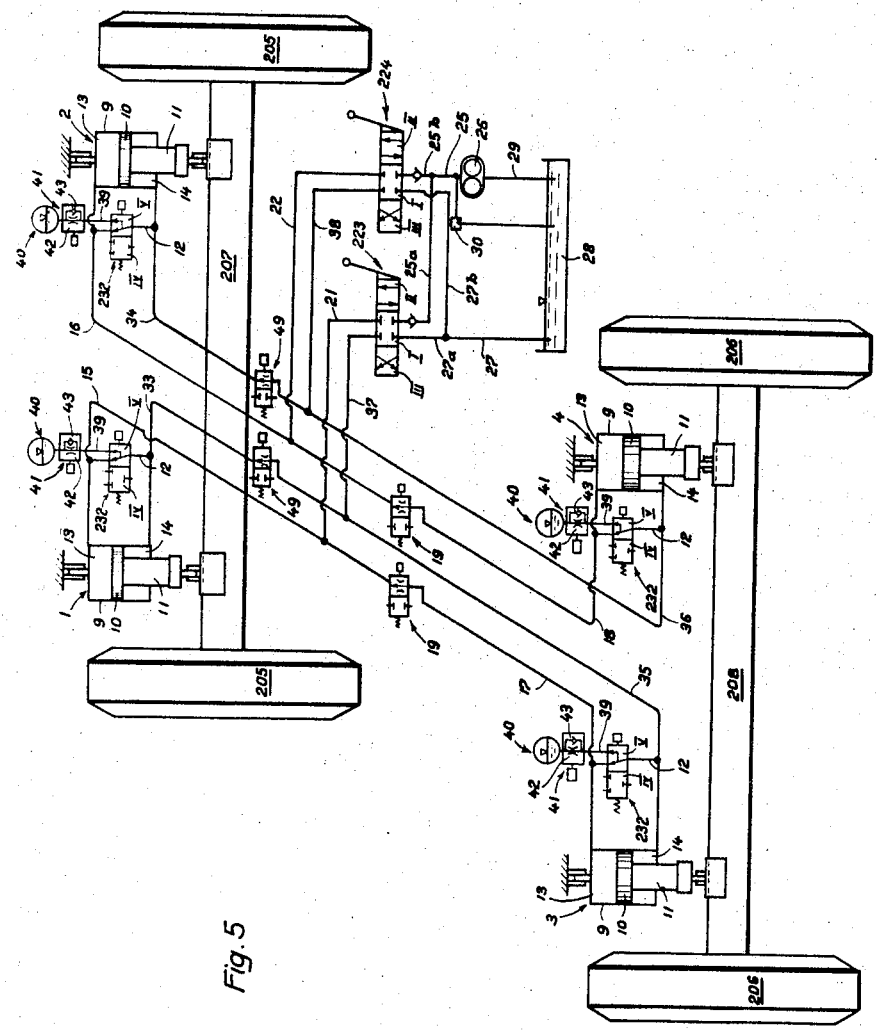

FIGURE 5 shows a wheel suspension, the structure of which corresponds substantially to that of FIGURE 3 and which, in addition, has hydraulically pneumatic cushioning elements which enable the cushioning of the vehicle wheels during the drive of the vehicle. The components, which are not described in detail hereinafter, of the wheel suspension are equal to the already described corresponding parts of the wheel suspension according to FIGURE 3 of the drawings.

In the embodiment according to FIGURE 5 of the drawings, in the bypass lines 12 there is provided a valve combination 232 instead of the shutoff valves 32, which assumes the function of two single shutoff valves. From the valve combination 232 leads a third branch line 39 to a hydraulically pneumatic cushioning element 40. In the third branch lines 39 is arranged a unilaterally acting throttle element 41 which includes a throttle constriction 42 and a check valve 43 connected in parallel with the throttle constriction.

The valve combination 232 can assume two control positions, by which all associated lines can either be separated from each other or connected with each other. Thus, in a first control position IV the bypass line 12 is interrupted, while the associated third branch line 39 is shut off. In a second control position V the bypass line 12 is open, while the corresponding third branch line 39 at this bypass line is closed, that is, the branch line 39 is in communication with the larger cylinder space 13 of the respective suspension element.

The cushioning elements 40 each consist of a compression-proof chamber in which one of the respective branch lines 39 opens directly. In this chamber is located a gas cushion, the volume of which is variable by a fluid pressure medium flowing to said gas cushion or from the latter through the third branch line 39. The change in volume of the gas cushion in the hydraulically pneumatic cushioning elements is connected with a change in pressure in the gas cushions and hence in the fluid pressure medium and is transmitted to the surfaces of the pistons 10 of the suspension element.

In the wheel suspension according to FIGURE 5 there are given exactly the same possibilities as described in conjunction with the wheel suspension of FIGURE 3. Also the control or switching operations belonging to the individual functions of the wheel suspension remain the same as before, considering the fact that the first control position IV of the valve combination 232 corresponds to the closed position of the shutoff valve 32 shown in FIGURE 3, while the second position V of the valve combination 232 corresponds to the open position of the shutoff valve 32 shown in FIGURE 3. Yet in particular during the travel of the vehicle provided with the present wheel suspension it is possible to additionally cushion the wheels of the vehicle. This cushioning of the wheels of the vehicle takes place when the valve combination 232 of the individual suspension elements is in its second control position V and when the individual compression-proof chambers of the hydraulically pneumatic cushioning elements 40 are in communication with the larger cylinder spaces 13 of the individual suspension elements by way of the third branch lines 39. The cushioning function will be elucidated in detail hereinafter.

Assume that upon the left-hand rear wheel 205 shown in FIGURE 5 there is exerted an impact from the roadway, and that this impact is transmitted to the piston 10 of the suspension element 1 by way of the rear wheel axle 207 and the piston rod 11. Then the piston 10 will move upwardly within the cylinder 9 of the suspension element 1 and piston 10 will displace one part of the pressure fluid in the larger cylinder space 13 so that said fluid will on its part partially escape through the bypass line 12 into the smaller cylinder space 14 of the same cylinder 9. Yet due to the volume of the piston rod 11 the smaller cylinder space 14 is not increased to the same extent as the volume of the larger cylinder space 13 decreases under the displacement of the piston 10, and a part of the pressure fluid will be completely displaced from the cylinder 9 of the suspension element 1. This displaced quantity of the pressure fluid escapes through the third branch line 39 into the pressure-tight chamber of the hydraulically pneumatic cushioning element 40, in consequence of which the air cushion in the chamber will be compressed. Therefore, the pressure in the hydraulically pneumatic cushioning element 40 and in the conduits connected therewith, as well as in the cylinder 9 of the suspension element 1 will be increased. The increase in pressure in said cylinder 9 causes an increase of the downwardly directed force action at the piston 10 of the suspension element 1, which force is then transmitted by way of the piston rod 11 and the rear wheel axle 207 in particular to the left-hand rear wheel 205. Consequently, the hydraulically pneumatic cushioning element 40 in its effect with respect to the suspension of a wheel, corresponds to a steel spring. Yet in contradistinction to a steel spring, the hydraulically pneumatic cushioning element 40 can be rendered inoperative in a simple manner in that the associated valve combination 232 is put into its control position IV. The possibility of rendering a suspension element inoperative is particularly advantageous for vehicles which have to be loaded with heavy loads or which are, for example, carrying crane superstructures and must stand fast on the spot independently of the load.

The pressure fluid flowing during the springing movement meets with a considerable mechanical resistance in the throttle elements 41, which resistance absorbs or damps the cushioning movement. Yet this mechanical resistance in the throttle elements 41 is effective only when the pressure fluid flows back from the chambers of the hydraulically pneumatic cushioning elements 40 and into the bypass lines 12, because in this direction the check valve 43 of each individual throttle element 41 is closed. Yet when, vice versa, the pressure fluid flows through the third branch lines 39 into the chambers of the hydraulically pneumatic cushioning elements 40, the check valves of the throttle elements 41 will clear the passage so that the pressure fluid will not have to flow through the throttle contractions 42 and consequently overcome a mechanical resistance. In this manner, each impact transmitted by the roadway to the vehicle wheels can be quickly absorbed without any vibrations of the vehicle.

Insofar as desired, in FIGURE 5, there takes place a wheel pressure compensation between the suspension elements 1 and 3 of the left-hand side of the vehicle and the suspension elements 2 and 4 of the right-hand side of the vehicle.

Obviously without diminishing the advantages achieved by the invention, it is possible to arrange a single hydraulically pneumatic cushioning element having correspondingly increased dimensions in a vehicle in the place of the individual hydraulically pneumatic cushioning elements 40 at each suspension element 1, 2, 3, 4, as well as to connect all branch lines 39 in the same manner to this hydraulically pneumatic cushioning element.

Figure 6:
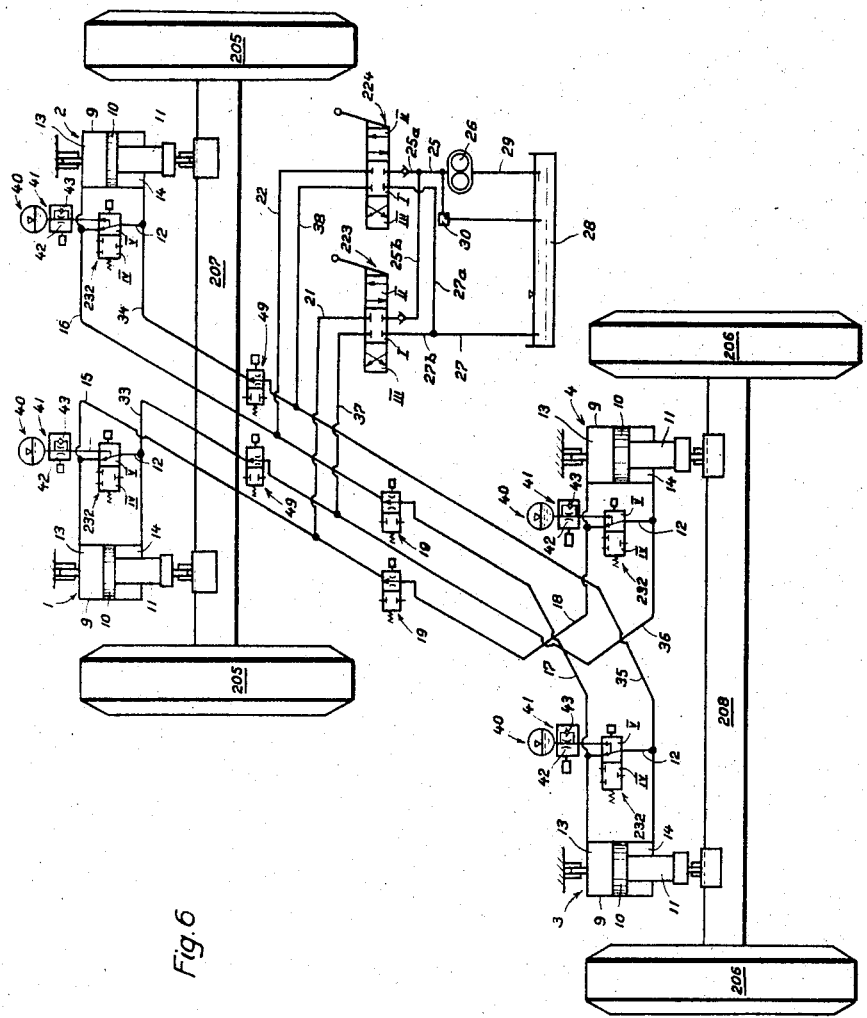
FIG. 6 is a schematic view of a modified embodiment of the wheel suspension shown in FIGURE 5.

The wheel suspension shown in FIGURE 6 differs from that of FIGURE 5 solely in that the respective branch lines are connected with each other in a different manner, whereby a possibly desired wheel pressure compensation takes place crosswise, as in FIGURES 2 and 4 between the suspension elements 1 and 4, on the one hand, and between the suspension elements 2 and 3, on the other.

In FIGURE 6, the branch lines 15 and 18 are connected wth each other and with the supply line 21. In addition, the branch lines 33 and 36 are connected with each other and with the supply line 37. Furthermore, the branch lines 16 and 17 are in communication with each other and with the supply line 22, while the branch lines 34 and 35 are connected with each other and with the supply line 38. The particular connection of these conduits corresponds to the connection shown in FIGURE 4. All functions described in conjunction with FIGURE 5 can also be carried out with the wheel suspension shown in FIGURE 6.

Figure 7:
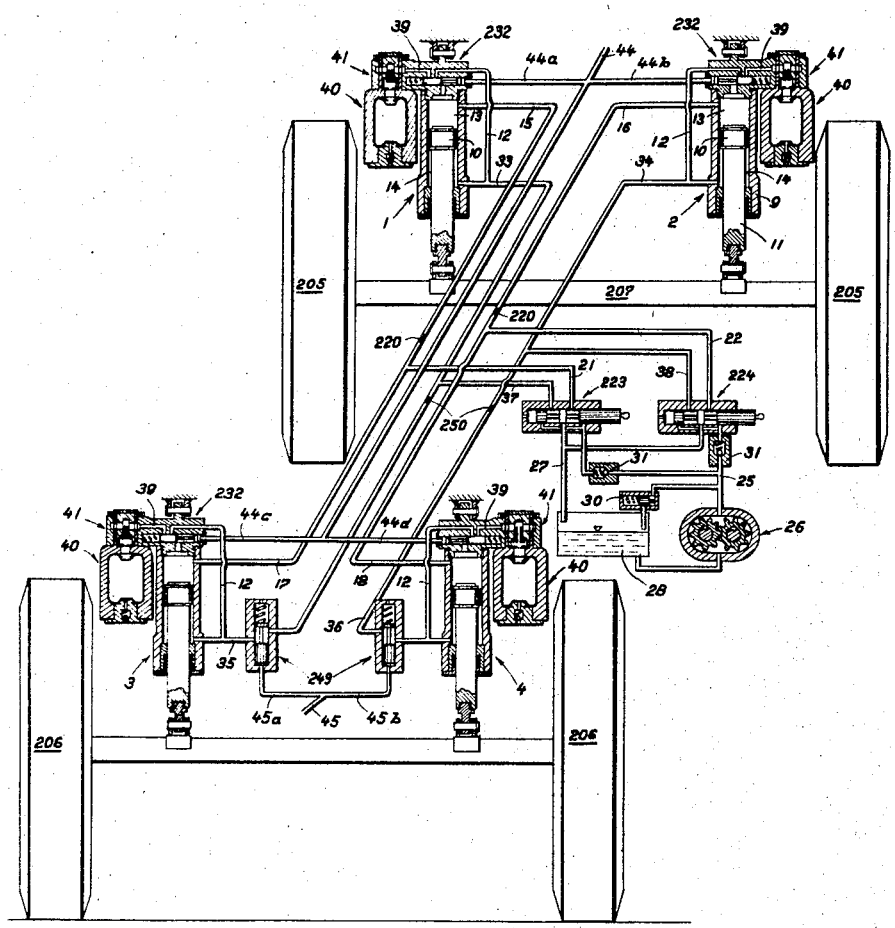
FIG. 7 is a view partly in elevation and partly in section of the wheel suspension of the invention according to FIGURE 5, with the pneumatic or hydraulic remote control of the shutoff valves.

The above described wheel suspensions can have any structural embodiment desired. A particular structural embodiment of the wheel suspension according to FIGURE 5 is represented in FIGURE 7. The same structural members in FIGURE 7 as well as in FIGURE 5 are provided with the same reference numerals.

The only difference between the embodiments in FIGURE 7 and FIGURE 5 consist in that in FIGURE 7 only the branch lines 35 and 36 each have a shutoff valve 249 which does not contain a throttle contraction. On the other hand, in the branch lines 17 and 18 there are provided respective throttle contractions 220, while in the branch lines 35 and 36 there are provided corresponding throttle contractions 250.

The valve combinations 232 in FIGURE 7 are hydraulically or pneumatically operated. Due to the hydraulic or pneumatic actuation, respectively, the valve combinations 232 can be remotely controlled from the driver's cab of the vehicle. A supply of the corresponding control medium to the valve combinations 232 takes place by way of a control conduit 44 which branches off four times and is connected by its branch lines 44a, 44b, 44c and 44d with the valve combinations 232 arranged in the bypass lines 12 of the four suspension elements 1, 2, 3 and 4. When no overpressure is prevailing in the control line 44, each valve combination 232 is in its first position IV in which the corresponding conduits 12 and 39 are shut off. Yet when a control medium under elevated pressure is introduced into the control conduit 44 and into the branch lines 44a, 44b, 44c and 44d, then each valve combination 232 assumes its second position V in which the corresponding bypass line 12 is open and connected with the corresponding branch line 39.

In FIGURE 7, the control conduit 44 leads to a driver's cab (not shown) of the vehicle, and from which the four valve combinations 232 can be simultaneously remotely controlled by introducing a control medium subjected to pressure in the above-described manner into the control conduit 44, or by discharging said control medium from the control conduit.

It is, of course, within the scope of this invention that the four branch lines 44a, 44b, 44c, 44d can be individually placed into the driver's cab, and that suitable means for the remote control of each individual valve combination 232 by way of the individual branch lines 44a, 44b, 44c and 44d should be provided therein. The control medium employed, for example, can consist of a hydraulic oil or air.

Also the shut-off valves 249 can be hydraulically or pneumatically operated. The corresponding control medium is fed to these two shutoff valves via a further control conduit 45 which branches off into branch lines 45a and 45b and is connected with the two shutoff valves by way of these branch lines. The control conduit 45 leads also to the driver's cab of the vehicle wherein there are provided suitable means for feeding a suitable control medium to this control conduit and for discharging the control medium from this control conduit. When no overpressure prevails in the control conduit 45, the shutoff valves 249 clear the passage through the branch line 35 and through the branch line 36. The shutoff valves 249 assume their closed position when the control conduit 45 is fed with a suitable control fluid under pressure, In FIGURE 7 there is provided only one common remote control for the two shutoff valves 249 in the branch lines 35 and 36. However, it is within the scope of this invention that the branch lines 45a and 45b can be located in the driver's cab, and that suitable means for feeding and discharging a control fluid to and from said branch lines are provided therein. Thus, with the hydraulic or pneumatic remote control it is also possible to individually actuate the shutoff valves 249.

Further structural details shown in FIGURE 5 will now be set forth in greater detail hereinafter in conjunction with FIGURES 8 and 10 which illustrate enlarged details of FIGURE 7.

Figure 8:
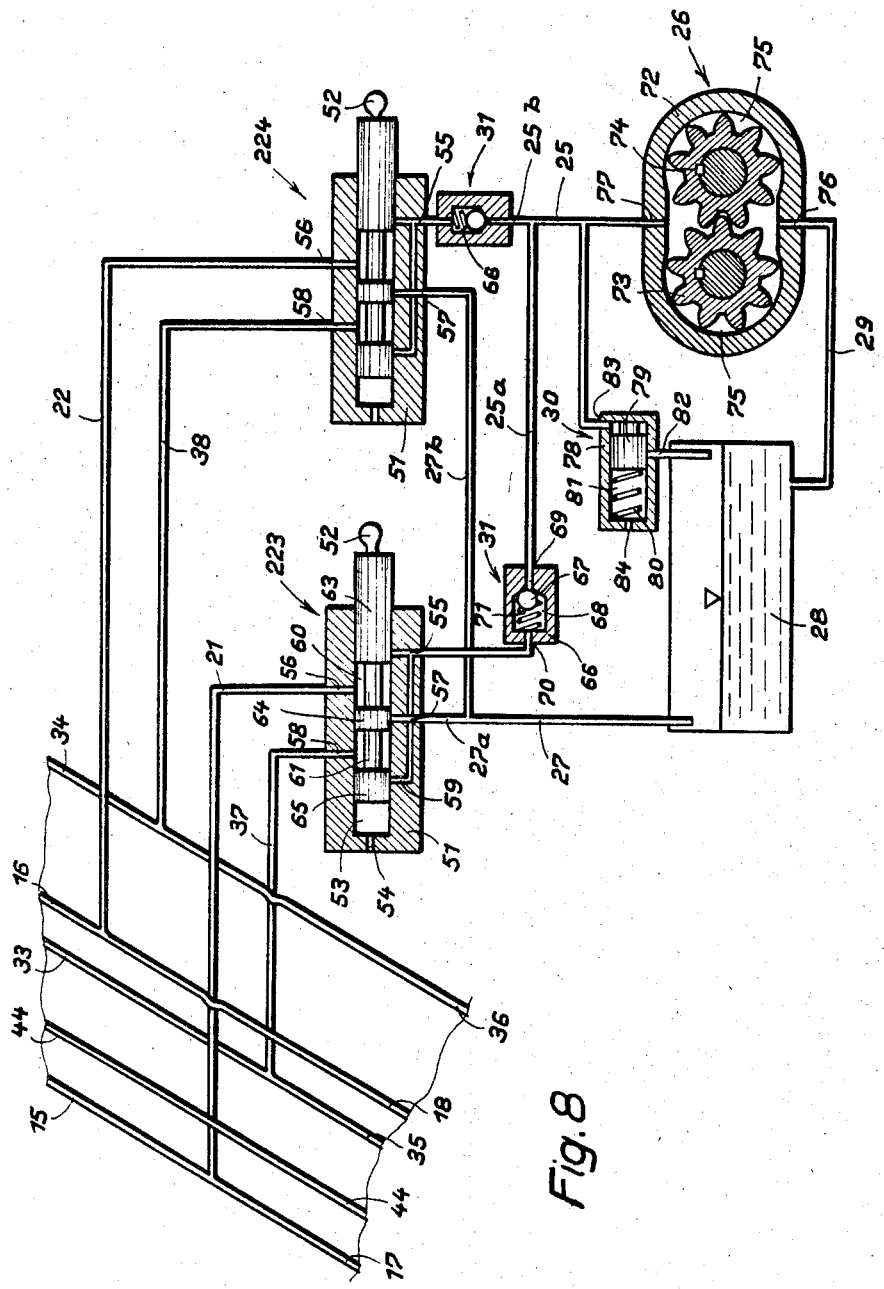
FIG. 8 is an enlarged detail of the view shown in FIGURE 7, showing both the source and container for fluid under pressure, both of which are adapted to be shut off.

According to FIGURE 8, the two valve units 223 and 224, respectively, consist of a housing 51 and a slide or plunger 52. The housing 51 has a substantially unilaterally open cylinder bore 53 in which the plunger 52 is movably arranged. For ventilation of this cylinder bore 53 there is provided a vent 54 at one end thereof.

In the bore 53 of each valve unit 223 and 224 terminate four mutually offset connecting openings 55, 56, 57 and 58 which lead outwardly through the housing 51. In the valve unit 223, the branch line 25a is connected with the opening 55, the supply line 21 with the opening 56, the branch line 27a with the opening 57, and the supply line 37 with the opening 58.

In the valve unit 224, the branch line 25b is connected with the opening 55, the supply line 22 with the opening 56, the branch line 27b with the opening 57, and the supply line 38 with the opening 58.

In both valve units 223 and 224 and within the wall of the housing 51 is provided a duct 59 which branches from the opening 55 and terminates behind the opening 58 in the bore 53.

Each slide 52 has two annular grooves 60 and 61 which divide the slide in three piston sections 63, 64, and 65 abutting the wall of the cylinder bore 53. The piston sections 63, 64 and 65 are designed with respect to their position and their longitudinal dimension in such a manner that they can simultaneously cover the outlets of the openings 55 and 57 as well as the outlet of the duct 59 in the bore 53. The breadth of the annular grooves 60 and 61 depends on the respective outlet spacings of the openings 55, 56, 57 and 58 as well as of the duct 59 along the wall of the bore 53 with respect to each other. The outlets of the connecting openings and of said duct are preferably dimensioned in the axial direction of the cylinder bore 53 in a constant equispaced relation with each other. The position of the connecting openings at the peripheral extent of the housing 51 is of no consequence. The breadth of the annular groove 60 is then to be designed so that at a corresponding position of said slide, the outlets of either the openings 55 and 56 or the openings 56 and 57 terminate within the range of said annular groove, while the breadth of the annular groove 61 is sufficiently large to permit either the outlets of the openings 57 or 58 or opening 58 and duct 59 to terminate in the wall of the bore 53 within the range of said annular groove.

Both valve units 223 and 224 are shown in their first control position I in which the slide 52 with its piston sections 63, 64 and 65 overlaps the outlets of the openings 55 and 57 as well as those of the duct 59 on the surface of the bore 53. The openings 56 and 58 are, in this position, open toward the annular grooves 60 and 61. Since the piston section 64 interrupts the connection between the annular grooves 60 and 61, and all the more since the outlets of the openings 55 and 57 as well as of the duct 59 at the wall of the bore 53 are covered, there is no mutual communication between the openings 55, 56, 57 and 58.

For the second control position II of one of the valve units 223 and 224, the corresponding slide 52 is drawn out from the inner bore 53 until the outlets of the openings 55 and 56 are cleared by the annular groove 60, and until the outlets of the openings 57 and 58 are cleared by the annular groove 61. In this second control position II, the outlet of the duct 59 remains covered in the wall of the bore 53 by the piston section 65. The respective third control position III of the valve units 223 and 224 is achieved by pushing the slide 52 into the cylinder bore 53 until the outlet of the opening 55 is covered by the piston section 63 and the outlets of the openings 56 and 57 are cleared within the range of the annular groove 60, and the outlets of the opening 58 and the duct 59 are cleared within the range of the annular groove 61.

Both check valves 31 in the branch lines 25a and 25b of the pressure line 25 are identical and consist substantially of a housing 66, a valve body 67 and a pressure spring 68. The housing 66 is formed with a longitudinal bore and has two openings 69 and 70 for the connection of the respectively corresponding pressure lines. In the housing 66 is located an enlarged inner space 71 which merges into a valve seat in the direction of the connecting opening 69. The valve body 67 which can be a simple steel ball is urged upon the valve seat by the pressure spring 68 which rests against the opposite wall of the enlarged inner space 71. In this position, the valve body 67 closes the connecting opening 69. When sufficiently high overpressure prevails within the pressure line 25 and when a sufficiently great pressure differential is effective at the corresponding valve body 67, the valve body will be raised from the valve seat at the opening 69 and clears the path for the corresponding pressure fluid through the check valve in the direction from the opening 69 toward the opening 70.

Due to the action of both check valves 31, in no operative condition will pressure fluid flow through the pressure line 25 and back into the pressure fluid container 28.

According to FIGURE 8, the pressure fluid pump 26 is a gear pump of a known structure, which consists substantially of a housing 72 and two interengaging toothed wheels 73 and 74. An opening 76 of the pressure fluid pump 26 is connected with the suction line 29, while opening 77 is in communication with the pressure line 25.

In FIGURE 8, the pressure relief safety valve 30 associated with the pump 26 has a piston slide 79 movable in a cylinder bore 81 of a housing 78. The piston 79 is normally held in an extreme position by a pressure spring 80, and in which position the piston covers the outlet of a discharge opening 82 in the wall of the cylinder bore 81. A feedback port 83 terminates in the cylinder bore at the piston side 79 opposite the pressure spring 80, while the space occupied by the pressure spring 80 is in communication with the outer atmosphere via a vent 84.

Both valve units 223 and 224 are suitably located in a driver's cab (not shown) and the operator can actuate the slide 52 of the respective valve unit either manually or through a suitable leverage.

Figure 9:
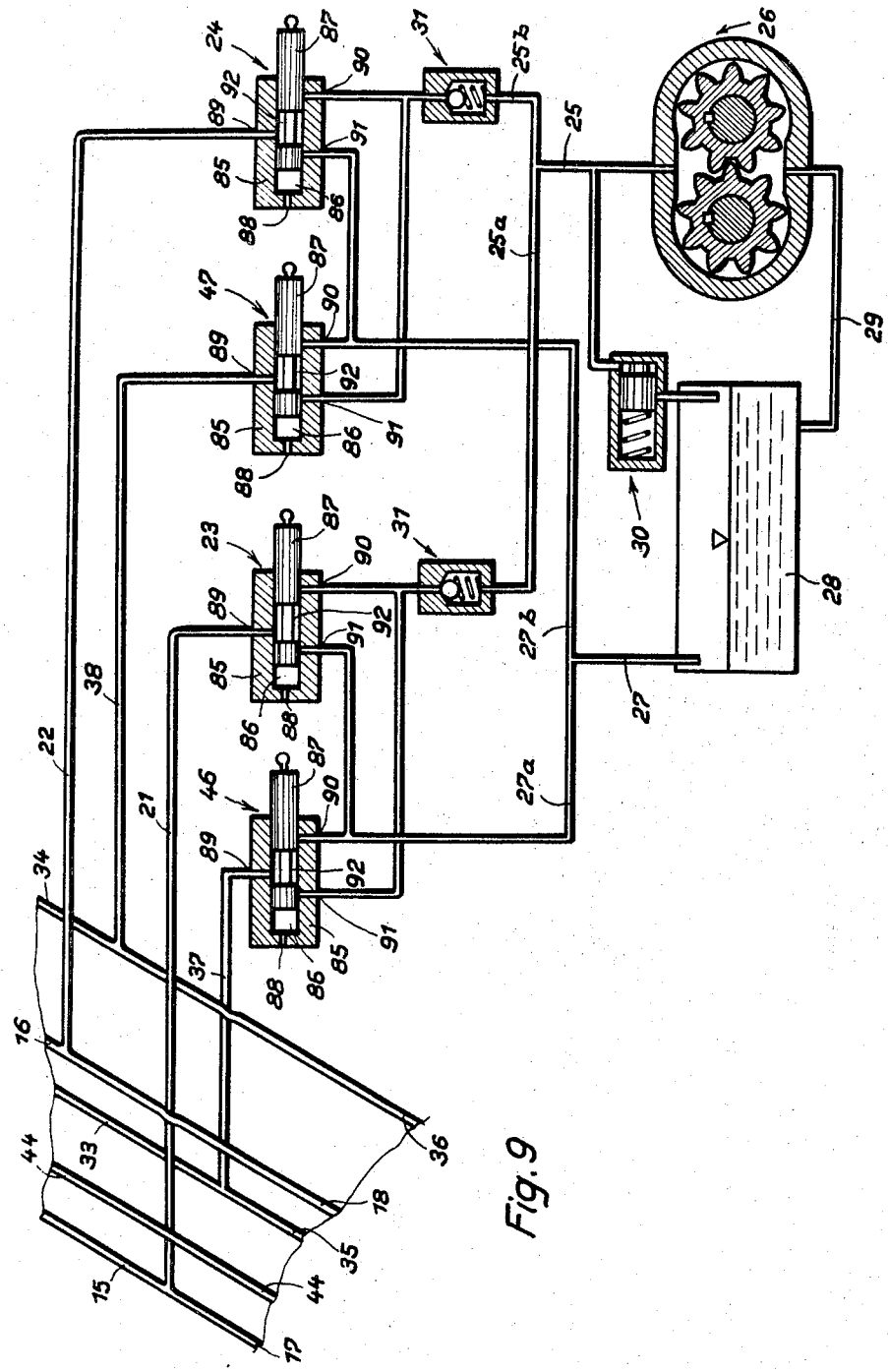
FIG. 9 is a view of a modified embodiment shown in FIGURE 8.

In FIGURE 9 is disclosed a modified embodiment of the wheel suspension of FIGURE 7 of the drawings, and a modified embodiment of the two valve units 223 and 224 in FIGURE 8. The same components in FIGURE 9 are in conformity with FIGURES 7 and 8 and bear the same reference numerals.

In FIGURE 9, the valve unit 223 is replaced by two three-way valves 23 and 36, while the valve unit 224 is replaced by two respective three-way valves 24 and 47. These three-way valves are similarly constructed and consist substantially of a housing 85 having a cylinder bore 86 and a piston 87 movable therein. The bore 86 is in communication with the outer atmosphere via a vent 88. In the cylinder bore 86 of each three-way valve terminate a first connecting port 89, a second connecting port 90 and a third connecting port 91. Viewed in the axial direction of the cylinder bore 86, the outlet of the first port 89 lies between the outlets of the second and third ports 90 and 91, respectively. The piston 87 has an annular groove 92, the breadth of which is so large that in a respective position of the piston 87, the groove will extend either over the outlets of the ports 89 and 90 or over the outlets of the ports 89 and 91. On the other hand, the annular groove 92 must be so narrow that the adjacent piston sections of the piston 87 in a position of the latter will cover the outlets of the second and third ports 90 and 91.

In FIGURE 9 are shown four three-way valves 23, 46, 24 and 47 in a first control position I, in which the corresponding piston sections of the piston 87 cover the outlets of the second ports 90 and of the third ports 91 in the bores 86. In this position no port is in communication with another port of the same valve.

In a second position II, each piston 87 of the corresponding cylinder bore 86 is so far displaced to the right that the outlet of the port 91 is still covered by one piston section of the piston slide, while the ports 89 and 90 are in communication with each other by way of the annular groove 92.

The piston 87 of a corresponding three-way valve in a third position III is displaced so far to the left that the outlet of the port 90 is covered by one of the piston sections, while the ports 89 and 91 are in communication with each other via the annular groove 92.

The supply lines 21, 22, 37 and 38 are each connected with the first port 89 of said three-way valve. Thus, the supply line 21 leads to the valve 23, line 22 to the valve 24, line 37 to the valve 46, and line 38 to the valve 47.

Each pressure line 25 as well as the discharge line 27 branch off four times. The branch line 25a of the pressure line 25, as well as the branch line 27a lead to the valves 23 and 46. The branch line 25b and 27b each lead to the three-way valves 24 and 47. Thus, with the pressure line 25 are connected the port 90 of the three-way valve 23, port 91 of the valve 46, port 90 of the valve 24, and port 91 of valve 47. Moreover, with the discharge line 27 are connected the port 91 of the three-way valve 23, the port 90 of the valve 46, the port 91 of valve 24 and port 90 of the valve 47.

It will be readily apparent that with the valves 23, 46, 24 and 47 there are possible the same switching functions as with the valve units 223 and 224. Also, the control positions of the three-way valves as in FIGURE 9 correspond to the control positions of the valve units 223 and 224 in FIGURES 5 and 8. The three-way valves shown in FIGURE 9 can be located in a driver's cab to be supported by the wheel suspension and they can be manually operated.

Figure 10:
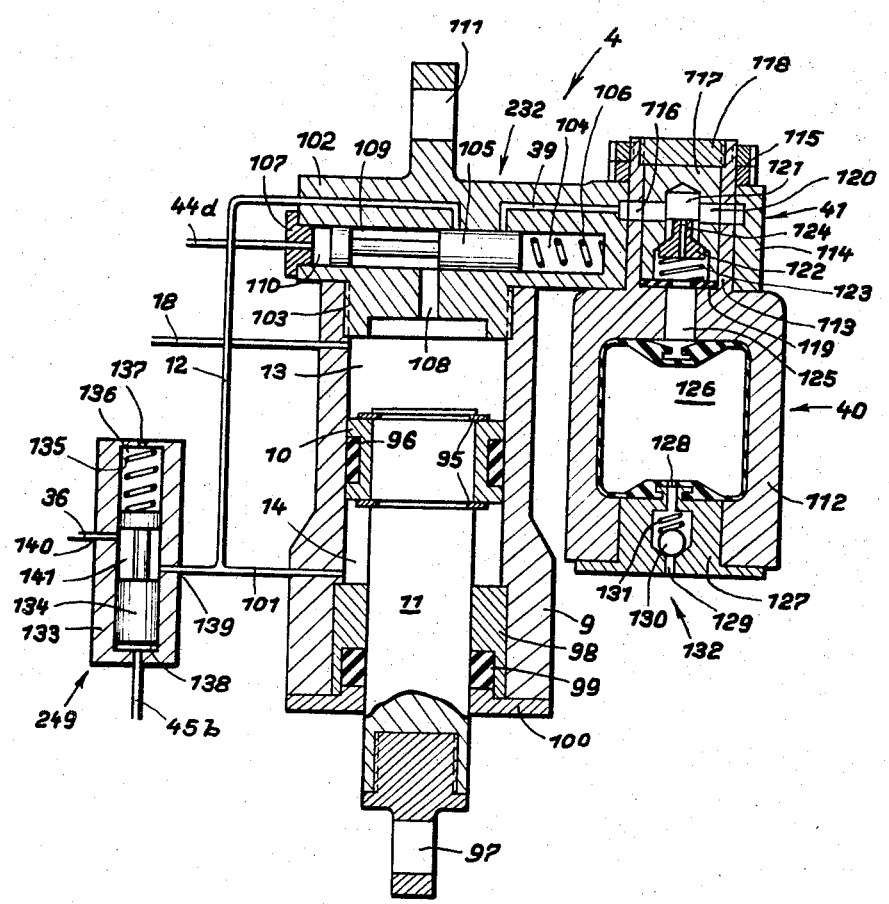
FIG. 10 is a cross-sectional view of a suspension element and a hydraulically pneumatic resilient element including pneumatically or hydraulically operated check valves in accordance with this invention.

FIGURE 10 shows an enlarged sectional view of FIGURE 7, namely, for a complete suspension element 4. The piston 10 is secured to the piston rod 11 by two split rings 95 and embodies a seal 96. At the lower end, there is attached an eye bolt 97 to the piston rod 11. The piston rod extends through a sealing bushing 98 having a seal 99 held in position by a cover or lid 100. The diameter of the piston rod 11 is relatively large so that upon displacement of the piston 10 in the cylinder 9, the change in volume in the larger cylinder space 13 will be greater than the change in volume in the space 14 with the same displacement of the piston 10.

At the lower end of the spacer 14 there terminates a conduit section 101 which is common for both branch line 36 and bypass line 12. At the uppermost end of the space 13 there terminates in the wall of the cylinder 9, the branch line 18.

The upper end of the cylinder 9 and its larger cylinder space, respectively, are closed by a housing member 102 which is threaded by a corresponding threaded sleeve 103 onto the cylinder. The member 102 encloses the valve combination 232.

In the housing member 102 is located a unilaterally open cylinder bore 104 in which is movable a piston 105 of the valve combination 232. The piston 105 is biased by a pressure spring 106 which rests on the end of the cylinder bore 104. At the open end of the bore 104 is disposed a cover 107 and through which branch line 44d of line 44 communicates with the bore 104.

A duct 108 leads from the space 13 through the sleeve 103 into the bore 104. Also, the bypass conduit 12 and the branch line 39 extend at least partly in corresponding channels of member 102 and terminate in the bore 104. The piston 105 is provided with an annular groove 109 which divides the piston in two sections. The right-hand piston section is of such a length that in one position of the piston, said piston section covers the corresponding outlets of the bypass line 12, on the one hand, and the branch line 12 in the wall of the bore 104, on the other. Moreover, the breadth of the annular groove 109 is such that in one position of the piston, the outlets of the bypass line 12, the branch line 39 and the duct 108 are cleared within the range of the annular groove.

In FIGURE 10 are shown the valve combination 232 and the piston 105 in the first control position IV in which the outlets of the bypass line 12 and the branch line 39 are covered by the corresponding piston section of the piston. The corresponding second control position V is achieved when the outlets of the bypass line 12, the branch line 39 and the duct 108 within the range of the annular groove 109 are cleared and the two lines are in communication with each other and with the duct 108.

The piston 105 together with the cover 107 and bore 104 defines a control pressure chamber 110, the volume of which increases or decreases when the piston 105 is moved. When a control fluid under pressure, such as for example a hydraulic oil, is fed through the conduit 44d to the control pressure chamber 110, the piston 105 is displaced against the force of the pressure spring 106 and assumes the previously described second control position V. When the pressure in the control pressure chamber 110 drops, the pressure spring 106 again displaces the piston to the first control position IV and hence the control fluid located in the control pressure chamber 110 through the conduit 44d.

An eye bolt 111 is an integral part of the housing member 102. The eye bolts 97 and 111 permit the securing of the suspension element 4 to a wheel axle, on the one hand, and to a chassis, on the other hand.

As shown in FIGURE 10, the hydraulically pneumatic cushioning element 40 is provided with a pressure container 112 including a throat 113. In the throat 113 is located the throttle 41 and the throat 113 extends through a corresponding bore in a projecting supporting arm 114 of the housing member 102 and is held therein by locking screws 115 which are threaded onto an outer thread at the end of the throat 113. The throat 113 is fitted in a pressure tight fashion in the supporting arm 114 so that a side bore 116 thereof forms an extension of the channel of the branch line 39 extending in the housing member 102.

In the throat 113 is inserted an insert 117 which is held in position by a threaded sleeve 118 and is forced against a sealing disc 119. The external mouth of a cross bore 120 of the insert 117 is is register with the bore 116 so that this bore forms an extension of the branch line 39.

A blind hole 121 arranged axially in the insert 117 traverses the cross bore 120 so that also the hole 121 forms an extension of the branch line 39. The hole 121 widens in the direction toward the pressure container 112 and defines a valve seat in the enlargement upon which a valve body 122 of the check valve 43 rests under the biasing action of a pressure spring 123. The spring 123 rests on the pressure container 112 and in the valve body 122 is arranged a throttle bore 124 which assumes the function of the throttle constriction 42 connected in parallel with the check valve 43.

The outer end of the hole 121 merges into a duct 125 which connects the throat 113 with the inner space of the pressure container 112. When the pressure existing in the pressure fluid at the side of the valve body 122 opposite the spring 123 is considerably greater than that in the interior of the container 112 and in the duct 125, respectively, then the valve body 122 will be lifted from the valve seat and clear a large cross-sectional flow area. Vice versa, when in the interior of the pressure container 112 there exists a pressure greater than that at the side of the valve body 122 opposite the spring 123, then the valve body will be urged by the spring 123 onto said valve seat so that only the cross-sectional flow area of the throttle bore 124 will be cleared for the pressure fluid.

When the pressure fluid consists of a liquid such as, for example, a hydraulic oil, the interior of the pressure container 112 contains a flexible bladder such as a rubber bladder, the interior of which is preferably filled with air.

The flexible bladder 126 is designed so that in the relaxed condition the same is in close engagement with the inner wall of the pressure container 112. Furthermore, the bladder 126 is anchored at its lower end to a valve insert 127. Within this anchoring, the flexible bladder has a hole 128 which opens in an axial bore 129 of the valve insert 127. Also, the bore 129 widens at the midpoint of its longitudinal extent and thus defines a valve seat. In the enlargement of the bore 129 is located a valve ball 130 which is urged by a pressure spring 131 against the valve seat. The valve insert 127, the axial bore 129, the valve ball 130 and the pressure spring 131 constitute a check valve 132 which operates as a so-called snifting valve.

When a low pressure exists in the interior of the bladder 126, the valve ball 130 is raised from its seat by the atmospheric pressure against the force of the spring 131 and clears the passage for atmospheric air which enters into the flexible bladder 126 and fills the same. On the contrary, air cannot escape from the flexible bladder through the check valve 132 because at a given pressure differential the spring 131 forces the valve ball 130 against the valve seat of the bore 129.

Due to the presence of the bladder 126, the pressure fluid flowing into the interior of the container 112 through the duct 125 remains separated from the air contained in the bladder at all times. The air contained in the flexible bladder 126 serves as a cushioning agent in accordance with the preceding specification.

The shutoff valve 249 consists of a housing 133, a piston 134 and a pressure spring 135. In the housing 133 is located a cylindrical inner space 136 which is in communication with the atmosphere by way of a vent 137 and the piston 134 is arranged in the space 136. At one side of the piston 134 is positioned the spring 135 while at the other side of the piston is defined a control pressure chamber having a connection for the branch line 45b of the line 45. In the space 136 terminate two openings 139 and 140 with which the ends of the branch line 36 are connected. The piston 134 is provided with an annular groove 141 which must be of such dimensions that in one position of the piston, the outlets of the openings 139 and 140 will lie within the range of the annular groove whereby flow from the opening 139 toward the connecting opening 140 will be possible.

When the chamber 138 is supplied with fluid under pressure, the piston 134 moves against the action of the spring 135 and with a piston section covering the outlets of at least one opening 139 and 140 at the wall of the space 136 so that the conduit 36 is closed. When the pressure in the chamber 138 decreases, the spring 135 urges the piston 134 into one position in which both outlets of the openings 139 and 140 lie within the range of the annular groove 141 so that fluid under pressure can flow between the openings 139 and 140 and in the branch line 36, respectively.

Figure 11:
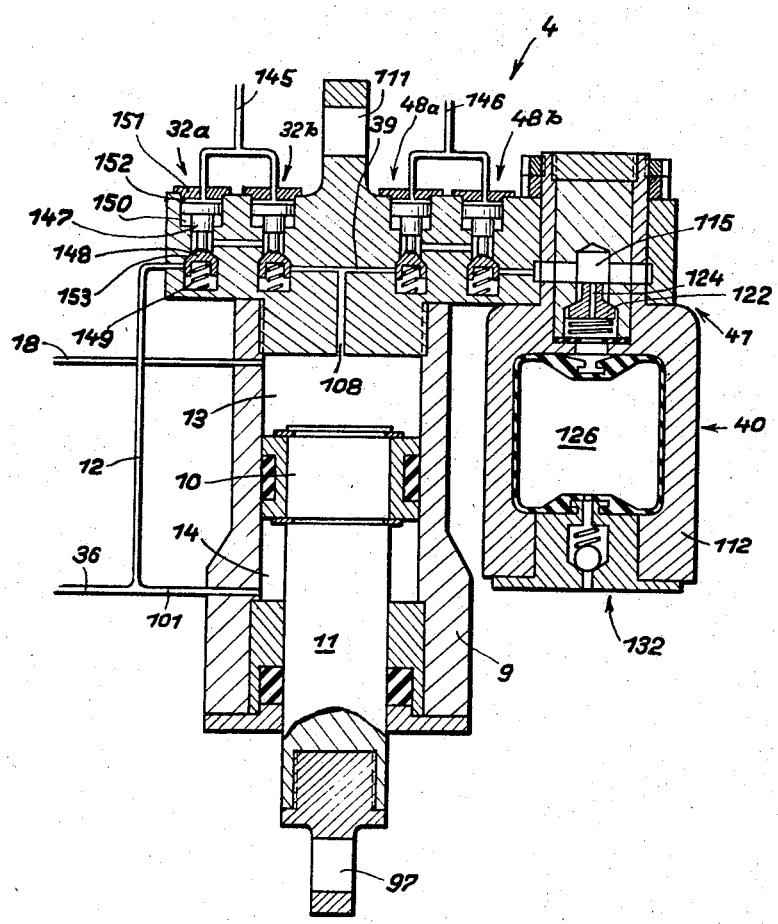
FIG. 11 is a cross-sectional view of a modified embodiment of a suspension element and of a hydraulically pneumatic resilient element according to FIGURE 10.

FIGURE 11 shows a modified embodiment of the suspention element 4, which differs from the embodiment of FIGURE 10 in that instead of the valve combination 232, two or two pairs of pneumatically or hydraulically operated shutoff valves are used. The shutoff valves 32a and 32b are located in the bypass line 12, while the shutoff valves 48a and 48b are connected with the branch line 39.

A control pressure conduit 145 leads to the valves 32a and 32b, and a control pressure conduit 146 leads to the shutoff valves 48 so that the bypass line 12 and the branch line 39 can be shut off or opened individually by remote control via the control pressure conduits.

Since each individual valve of the embodiment shown in FIGURE 11 will be automatically opened similarly to a check valve under the action of a pressure differential acting in a predetermined direction, two such-like valves are arranged pairwise in a counter direction in such a manner that at least one of the two valves remains closed regardless of the pressure differential when the corresponding conduit is closed at all and a correspondingly low control pressure exists in the control pressure lines 145 and 146.

The four valves 32a, 32b, 48a and 48b are of similar construction so that the description of a single valve such as the valve 32a applies to the valves 32b, 48a and 48b.

The valve 32a is arranged in the housing member 102 and comprises a differential or stepped piston 147, a valve body 148 secured to the piston, and a pressure spring 149. The stepped piston 147 together with the associated valve body 148 is arranged in a multiple-stepped bore 150 in the housing member 102. Above the stepped piston is located a cover 151 which is provided with a junction for the control pressure line 145 and closes the bore 150 toward the top thereof. Between the stepped piston 157 and the cover 151 is provided a control pressure chamber 152, the volume of which is variable according to the displacement of the piston 147. The spring 149 which is supported on the end side of the bore 150 urges the stepped piston 147 into a position in which the volume in the control pressure chamber 152 is as small as possible.

The bore 150 for its part forms a valve seat 153 on which the valve body 148 engages under the pressure of the spring 149 so long as no corresponding overpressure is present within the chamber 152. At either side of the valve seat 153 terminates an end of the duct forming the bypass conduit 12 in the bore 150. Thus, when the valve body 148 is raised from the valve seat 153 under the force of a pressure fluid under elevated pressure, the shutoff valve 32a will be opened.

With respect to the shutoff valves 48a and 48b as regards their otherwise equal function, it is only to be noted that the branch line 39 is controlled by these valves.

Finally, it is to be noted that with particularly the two shutoff valves 32a and 32b in the wheel suspensions shown in FIGURES 3 and 4 can be employed in lieu of the shutoff valves 32.

Figure 12:
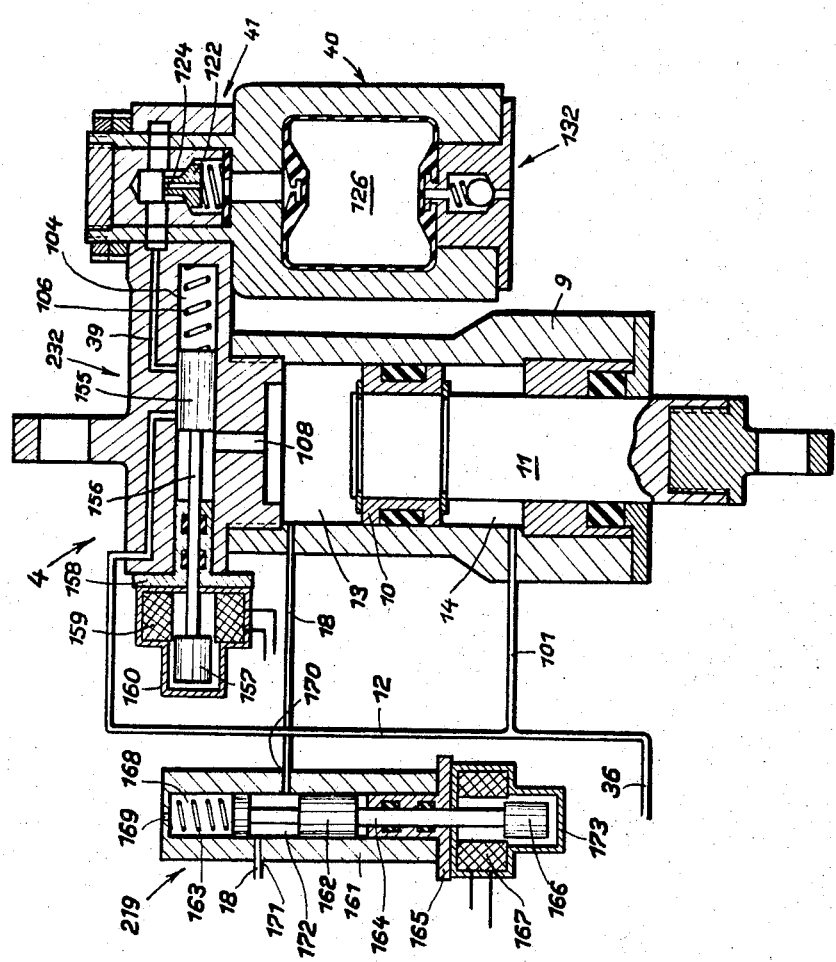
FIG. 12 is a cross-sectional view of a suspension element and of a hydraulically pneumatic cushioning element including electrically operated shutoff valves according to this invention.

The embodiment shown in FIGURE 12 includes a shutoff valve 219 and a suspension element as shown schematically in FIGURES 5 and 6. The shutoff valve 219 differs from the shutoff valves 19 in FIGURES 5 and 6 only in that the shutoff valve 219 has no throttle contraction. The shutoff valve 219 is rather similar to a substantial extent to the shutoff valve 237 of FIGURE 10. Therefore, the members in FIGURE 12 which correspond to those in FIGURE 10 bear the same reference characters.

In FIGURE 12, the valve combination 232 is electrically operated. The means for the electrical actuation of the combination 232 comprise a piston 155, a piston rod 156, a magnet core 157, a sealing bushing 158 and a solenoid coil 159. The piston 155 as well as the sealing bushing 158 in conjunction with the electromagnetic control means are provided in place of the piston 105 and the cover 107 shown in FIGURE 10. All further components of the valve combination 232 can be incorporated without any modification from the embodiment of FIGURE 10 into the embodiment of FIGURE 12.

The piston rod 156 extends through the sealing bushing 158 and at one end carries the piston 155, while the core 157 is carried at the other end. The piston 155 is movably mounted in the cylinder bore 104. Toward the outside, the bore 104 is sealed by a sealing bush 158 which holds the solenoid coil 159 and together with the core 157 is suitably enclosed by a housing 160 which housing 160 serves as protection against dust and dirt. The spring 106 urges the piston 155 into a position in which the piston covers the outlets of the bypass line 12 and the branch line 39 at the wall of the bore 104. In this position, the magnet core 157 projects outwardly from the solenoid coil.

When the solenoid coil is energized, the magnetic field created thereby attracts the magnetic core 157 to the right. The movement of the magnetic core 157 is transmitted via the piston rod 156 to the piston 155, whereby the piston is displaced to the right against the force of the spring 106 until the outlets of the bypass line 112 and line 39 at the wall of the bore are cleared. This position corresponds to the second control position V of the valve combination 232 and the first control position IV of the combination 232 is represented in FIGURE 12.

The shutoff valve 219 comprises a housing 161, a piston 162, a pressure spring 163, a piston rod 164 and a sealing bushing 165. The appertaining electromagnetic actuating means comprises a magnetic core 166 and a solenoid coil 167. In the housing 161 is provided a bore 168 which is in communication with the outer atmosphere by way of a vent 169. In the bore 168 there is movably arranged the piston rod 162 and into the cylinder bore 168 open two openings 170 and 171, both of which are connected with the branch line 18. The piston 162 is provided with an annular groove 172 which is of such width that upon a predetermined position of the piston, the outlets of the openings 170 and 171 lie within the confines of said annular groove 172. Into this position, the piston 162 is urged by the pressure spring 163 which is also located in the bore 168.

Through the sealing bushing 165 which seals the bore 168 toward the exterior, there extends the piston rod 164, and the free end of which carries the magnetic core 166. The solenoid coil 167 is secured to the sealing bushing 165 and in like manner to the magnetic core 166 is suitably surrounded by a housing 173 which protects the magnetic coil and the solenoid coil against dust and dirt.

So long as the solenoid coil 167 is not energized, the core 166 is subject to the force exerted by the spring 163 outside of said coil. On the other hand, when the solenoid coil 167 is energized with electric current, the thus created magnetic field urges the core 166 into the coil 167 and hence pushes the piston into a position in which a corresponding piston section of said piston covers at least one of the outlets of the openings 170 and 171 at the wall of the bore 168. In this position, the branch line 18 is closed.

Figure 13:
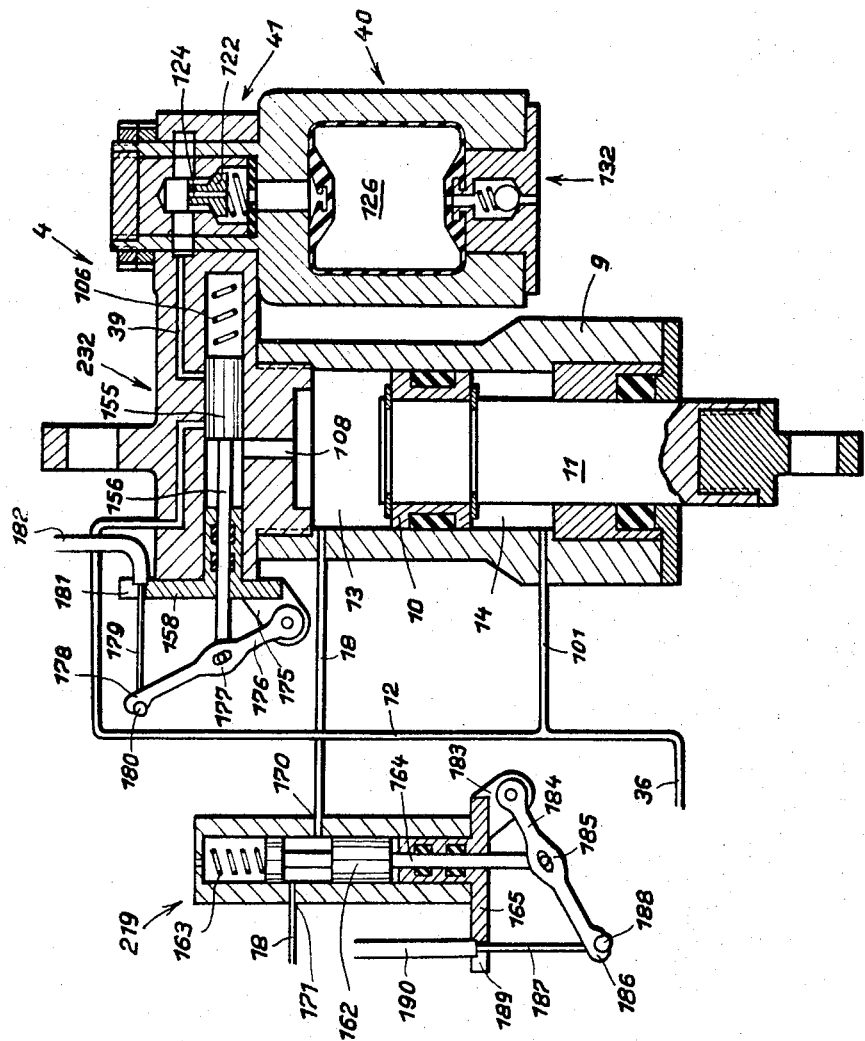
FIG. 13 is a cross-sectional view of a suspension element and of a hydraulically pneumatic cushioning element including mechanically operated remotely controlled shutoff valves according to this invention.

FIGURE 13 shows another modified embodiment of the suspension element 4 and of the shutoff valve 219 shown in FIGURE 12. In this embodiment, the valve combination 232 and the shutoff valve 219 are remotely controlled mechanically. The same components in FIGURES 13 and 12 bear the same reference numerals.

In FIGURE 13, the sealing bushing 158 is provided with a joint bar 175 to which a hinge lever 176 is hinged in lieu of a solenoid coil. Also, a shiftable link 177 of the hinge lever 176 is connected to the piston rod 156. The hinge lever 176 is provided with a fork 178 at the end opposite the joint bar 175 while a button 180 secured to the end of a wire pull 179 lies in said fork.

The sealing bushing 158 is formed with two support lugs 181, on which there is supported the end of a flexible tube 182. The wire pull passes between the support lugs 181 and extends within the flexible tube 182 toward the location from which the valve combination 232 is to be remotely controlled. This location can be a driver's cab (not disclosed) provided with the suspension elements shown in FIGURE 13. The wire pull 179 and the flexible tube 182 are defined by a known Bowden wire pull.

The spring 106 urges the piston 155 into a position in which the outlets of the bypass line 12 and the branch line 39 at the wall of the bore 104 are covered. When the operator actuates the Bowden wire pull consisting of the steel cable 179 and flexible tube 182, or when he pulls the steel wire 179, respectively, the piston 155 will be brought via the piston rod 156, hinge 177 and hinge lever 176 against the force of the spring 106 into a position where the outlets of the bypass line 12 and the branch line 39 at the wall of the bore 106 are exposed and where the bypass line 12 and the branch line 39 are open.

Also the sealing bushing 165 has a joint bar 183. On this joint bar as well as on the piston rod 164, there is hinged a hinge lever 184. A shiftable link 185 provides a connection between the lever 184 and the rod 164. Also, the lever 184 is provided with a fork 186 in which a button 188 secured to one end of a wire pull 187 lies.

In addition, the sealing bushing 165 has two supporting lugs 189 on which the end of a flexible tube 190 is supported. The wire pull 187 extends within the tube 190 up to a position from which the shutoff valve 219 will be remotely controlled. This position can be a driver's cab provided with the represented means. The wire pull 187 together with the flexible tube 190 may be defined by a known Bowden wire pull.

In FIGURE 13, the spring 163 urges the piston 162 into a position in which the outlets of the openings 170 and 171 at the wall of the bore 168 are cleared, so that the branch line 18 is open. On the other hand, when the operator pulls the wire pull 187, the piston 162 will be urged against the action of the spring 163 via the piston rod 164, the link 185 and the hinge lever 184 into a position in which at least one of the outlets of the openings 170 and 171 is covered. In this position, the branch line 18 is closed.

Although a number of illustrative embodiments and modifications of the wheel suspension in accordance with this invention have been described and represented herein, it is to be understood that the invention is not limited to these precise embodiments, and that many further various changes and modifications of the wheel suspension, which are not illustrated herein, may be effected therein without departing from the scope or spirit of the invention, except as defined in the appended claims.

Thus, for example, FIGURES 7, 10 and 11 show hydraulically or pneumatically operated shutoff valves 32a, 32b, 48a, 48b and 249 as well as a pneumatically operated valve combination 232. It stands to reason that also the shutoff valves 19, 32 and 37, as well as the valve units 223 and 224 or the three-way valves 23 and 24 can be constructed in like manner.

When the whole wheel suspension of a vehicle according to the invention shall be remotely controlled electrically or mechanically, then FIGURES 12 and 13 of the drawings can serve as a model for the embodiment of the whole wheel suspension. It is, of course, within the ability of one skilled in the art to employ the electromagnetic actuating means represented in FIGURE 12 by way of example respecting the shutoff valve 219 and the valve combination 232 also for the actuation of the other valves such as, for example, the shutoff valves 19 and the three-way valves 23, 24, 32, 32a, 32b, 48a, 48b, 49, as well as for the actuation of the valve units 223 and 224. The same also applies to the mechanical actuating means shown in FIGURE 13 respecting the shutoff valve 219 and the valve combination 232; also these actuating means can be analogously utilized by those skilled in the art for the remote control of all other shutoff valves, three way valves and valve units coming into the question.

Furthermore, it is also within the scope of this invention to provide particular damping or shock absorbing effects throughout the entire wheel suspension system by the specific distribution of throttle elements such as the throttle element 41, or by the particular distribution of throttle contractions such as the throttle constrictions 20, 50, 220 and 250 in the various branch lines. Hence, it is possible that either the bypass conduits 12 or the therein arranged shutoff valves 32 or the valve combinations 232, respectively, have throttle constrictions. Also the throttle constrictions provided in the bypass conduits 12 contribute to the damping of the vibrations in the entire wheel suspension system.

Finally, it is to be noted that this invention is not limited to the structural embodiments of the several components of the wheel suspension system disclosed in FIGURES 7–13, but that this invention rather includes any structural embodiment desired of the individual structural members and parts within the scope and spirit of the appended claims.

What is claimed is:

1. A wheel suspension system for vehicles having a chassis, at least two front and two rear wheels, axles for the wheels, and a suspension element for each wheel, each suspension element including a cylinder, a piston movable therein and a piston rod having a substantial diameter with respect to the diameter of the piston provided with an end projecting from the cylinder, the space between the piston and one end of the cylinder being of greater volume than the space surrounding the piston rod and the opposite end of the cylinder, said cylinders always being filled with fluid, means connecting the projecting end of each piston rod to the respective wheel axle, means connecting each cylinder to the chassis, a first conduit leading from the space of greater volume of a cylinder for a front wheel to the space of greater volume of a cylinder for a rear wheel, a second conduit leading from the space of lesser volume of a front wheel to the space of lesser volume of a cylinder for a rear wheel, a branch conduit for each cylinder between said first and second conduits, valve means for each said branch conduit operable to control the flow between the greater and lesser spaces of each cylinder via said first, second and branch conduits, a pressure fluid source, a fluid container, additional conduits connecting said first and second conduits to said pressure fluid source and fluid container, respectively, further valve means for said additional conduits for controlling fluid flow through said conduits, and driver actuated cutoff valve means arranged in said first and second conduits for controlling the fluid flow through said first and second conduits.

2. The wheel suspension system as claimed in claim 1 in which said first and second conduits connect respectively the spaces of greater and lesser volume of the cylinders for the wheels on the same side of the vehicle.

3. The wheel suspension system as claimed in claim 1 in which said first and second conduits connect respectively the spaces of greater and lesser volume of the cylinders on one side with the spaces of greater and lesser volume of the cylinders on the opposite sides of the vehicle.

4. The wheel suspension system as claimed in claim 1 in which said first and second conduits include restricted passages for restricting fluid flow through said conduits.

5. The wheel suspension system as claimed in claim 1 in which said further valve means includes first and second three-way valves said additional conduits including a first line leading from each first conduit and second conduit to first ducts of the first and second valves respectively, a second line leading from the second ducts of each valve to the pressure fluid source and a third line leading from third ducts of each valve to the fluid container so that in one position, the pressure fluid source and fluid container are cut off from said cylinder spaces of greater and lesser volume in a second position the pressure fluid source is connected to the cylinder spaces of greater volume and the fluid container to the cylinder spaces of greater volume and the pressure fluid source to the cylinder spaces of lesser volume.

6. The wheel suspension system as claimed in claim 1 including a pneumatic cushioning means for each cylinder, a further branch conduit between said pneumatic cushioning means and said valve means for said first branch conduit for placing the greater cylinder space in communication with the pneumatic cushioning means, at least some of said first and second conduits having restrictions for restricting fluid flow therethrough and each further branch conduit having a unidirectional restriction therein.

7. The wheel suspension system as claimed in claim 1 including a pneumatic cushioning means for each cylinder, a further branch conduit between said pneumatic cushioning means and said valve means for said first branch conduit for placing the greater cylinder space in communication with the pneumatic cushioning means, said further valve means including first and second three-way valves, said additional conduits including a first line leading from each first conduit and second conduits to first ducts of the first and second valves respectively, a second line leading from second ducts of each valve to the pressure fluid source and a third line leading from third ducts of each valve to the fluid container so that in one position, the pressure fluid source and fluid container are cut off from said cylinder spaces of greater and lesser volume, in a second position, the pressure fluid source is connected to the cylinder spaces of greater volume and the fluid container to the cylinder spaces of lesser volume and in a third position, the fluid container is connected to the cylinder spaces of greater volume and the pressure fluid source to the cylinder spaces of lesser volume.

8. The wheel suspension system as claimed in claim 1 including a pneumatic cushioning means for each cylinder, a further branch conduit between said pneumatic cushioning means and said valve means for said first branch conduit for placing the greater cylinder space in communication with the pneumatic cushioning means, said valve means having two operating positions and in the first position the greater space is connected to the lesser space of the same cylinder and to the pneumatic cushioning means associated therewith while in the second position the greater space is disconnected from the lesser space and the pneumatic cushioning means.

9. The wheel suspension system as claimed in claim 1 including a pneumatic cushioning means for each cylinder, and a further branch conduit between said pneumatic cushioning means and said valve means for said first branch conduit for placing the greater cylinder space in communication with the pneumatic cushioning means.

10. The wheel suspension system as claimed in claim 9 in which said first and second conduits connect respectively the spaces of greater and lesser volume of the cylinders for the wheels on the same side of the vehicle.

11. The wheel suspension system as claimed in claim 9 in which said first and second conduits connect respectively the spaces of greater and lesser volume of the cylinders on opposite sides of the vehicle.

References Cited

UNITED STATES PATENTS

| | | | |
|---|---|---|---|
| 2,687,311 | 8/1954 | Nallinger | 280—124 |
| 2,869,892 | 1/1959 | Sahagian | 280—124 |
| 2,976,054 | 3/1961 | Sahagian | 280—124 |
| 3,068,023 | 12/1962 | Fiala | 280—124 |
| 3,179,432 | 4/1965 | Chaneac | 280—6 |

LEO FRIAGLIA, *Primary Examiner.*

BENJAMIN HERSH, *Examiner.*

P. GOODMAN, *Assistant Examiner.*